(12) United States Patent
Law et al.

(10) Patent No.: US 10,697,583 B2
(45) Date of Patent: Jun. 30, 2020

(54) MOUNT ATTACHMENT FOR AN ELECTRONIC DEVICE

(71) Applicant: GOOGLE LLC, Mountain View, CA (US)

(72) Inventors: Jeffrey Law, San Francisco, CA (US); William Dong, Redwood City, CA (US); Oliver Mueller, San Francisco, CA (US); Kevin Booth, Mountain View, CA (US); Tyler Wilson, San Francisco, CA (US); Mark Kraz, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 346 days.

(21) Appl. No.: 15/710,765

(22) Filed: Sep. 20, 2017

(65) Prior Publication Data

US 2018/0187828 A1    Jul. 5, 2018

Related U.S. Application Data

(63) Continuation-in-part of application No. 29/609,550, filed on Jun. 30, 2017, now Pat. No. Des. 843,431.
(Continued)

(30) Foreign Application Priority Data

Jan. 4, 2020    (EM) .......................... 003569169-0002

(51) Int. Cl.
*F16M 11/12* (2006.01)
*F16M 13/02* (2006.01)
(Continued)

(52) U.S. Cl.
CPC ........ *F16M 13/022* (2013.01); *F16M 11/041* (2013.01); *F16M 11/125* (2013.01);
(Continued)

(58) Field of Classification Search
CPC .... G03B 17/561; G03B 17/56; G03B 17/566; F16M 11/06; F16M 11/08; F16M 11/10; F16M 11/12
(Continued)

(56) References Cited

U.S. PATENT DOCUMENTS 3,165,899 A    1/1965 Shatto, Jr.
3,351,904 A    11/1967 Noruk
(Continued)

OTHER PUBLICATIONS

Google, Notification of Registration, 004086734, Jul. 14, 2017, 6 pgs.

*Primary Examiner* — Clayton E. LaBalle
*Assistant Examiner* — Fang-Chi Chang
(74) *Attorney, Agent, or Firm* — Morgan, Lewis & Bockius LLP

(57) ABSTRACT

An attachment mechanism for mounting an electronic device to a surface including a mounting plate configured to attach to the surface, the mounting plate having at least one projection, and a base configured to releasably couple to the mounting plate. The base may include a first biasing member, and a first arm pivotably coupled to the base and biased toward a first direction by the first biasing member, the first arm configured to interlock with the at least one projection when the base is coupled to the mounting plate. The base may further include a release mechanism coupled to the first arm such that actuation of the release mechanism when the base is coupled to the mounting plate in a secured engagement causes movement of the first arm in a second direction to disengage the first arm from the at least one projection to enable detachment of the base from the mounting plate.

22 Claims, 16 Drawing Sheets

Related U.S. Application Data

(60) Provisional application No. 62/560,611, filed on Sep. 19, 2017.

(51) Int. Cl.
*G03B 17/56* (2006.01)
*F16M 11/22* (2006.01)
*F16M 11/04* (2006.01)
*F16M 11/14* (2006.01)
*F16M 11/16* (2006.01)

(52) U.S. Cl.
CPC ............ *F16M 11/14* (2013.01); *F16M 11/16* (2013.01); *F16M 11/22* (2013.01); *F16M 13/02* (2013.01); *G03B 17/561* (2013.01); *F16M 2200/02* (2013.01); *F16M 2200/08* (2013.01)

(58) Field of Classification Search
USPC .................. 396/427; 348/143; 248/187.1
See application file for complete search history.

(56) References Cited

U.S. PATENT DOCUMENTS

| | | | |
|---|---|---|---|
| 4,498,038 A | 2/1985 | Malueg | |
| 5,201,896 A | 4/1993 | Kruszewski | |
| 5,785,286 A * | 7/1998 | Hiesinger | F16M 11/041 248/187.1 |
| 5,790,910 A | 8/1998 | Haskin | |
| 7,736,071 B2 | 6/2010 | Wahl et al. | |
| 8,267,361 B1 | 9/2012 | Dordick | |
| 2002/0131781 A1 | 9/2002 | Buck | |
| 2004/0233623 A1 | 11/2004 | Hillman et al. | |
| 2005/0275725 A1 | 12/2005 | Olsson et al. | |
| 2007/0290117 A1 | 12/2007 | Hetrick et al. | |
| 2008/0210832 A1 | 9/2008 | Speggiorin | |
| 2009/0317071 A1 | 12/2009 | David | |
| 2010/0128165 A1 | 5/2010 | Newcomb et al. | |
| 2011/0242321 A1 | 10/2011 | Nakajima et al. | |
| 2012/0263450 A1 | 10/2012 | Totani | |
| 2013/0176434 A1 | 7/2013 | Pierce et al. | |
| 2014/0240589 A1 | 8/2014 | Hoof Van | |
| 2014/0263908 A1 | 9/2014 | Franklin | |
| 2014/0313358 A1 * | 10/2014 | Yu | H04N 5/23203 348/211.7 |
| 2016/0119516 A1 | 4/2016 | Clearman | |
| 2018/0091775 A1 | 3/2018 | Jung et al. | |
| 2018/0109704 A1 | 4/2018 | Gilbert | |
| 2018/0296365 A1 | 10/2018 | Nielsen et al. | |
| 2018/0325228 A1 | 11/2018 | Leimer | |
| 2019/0075225 A1 | 3/2019 | Maggard et al. | |

\* cited by examiner

MOUNT ATTACHMENT FOR AN ELECTRONIC DEVICE

RELATED APPLICATIONS

This application claims priority to U.S. Provisional Patent Application No. 62/560,611, filed Sep. 19, 2017, entitled "Temperature-Controlled Camera Assembly," and is a continuation-in-part of U.S. Design patent application No. 29/609,550, filed Jun. 30, 2017, entitled "Camera," which claims priority to European Community Design Application No. 003569169-0002, filed Jan. 4, 2017, each of which is hereby incorporated by reference in its entirety.

This application is related to U.S. patent application Ser. No. 15/710,770, filed Sep. 20, 2017, entitled "Camera Assembly with Concave-Shaped Front Face," and U.S. patent application Ser. No. 15/710,758, filed Sep. 20, 2017, entitled "Mount Hinge for an Electronic Device," each of which is hereby incorporated by reference in its entirety.

TECHNICAL FIELD

The present invention relates to a mount for an electronic device including, but not limited to, a mount for a camera module. The present invention also relates to an attachment mechanism for securing an electronic device to a surface, such as a wall or ceiling, and a hinge for positioning the electronic device relative to the attachment mechanism. The present invention further relates to electronic device systems including the mount, hinge, and/or attachment mechanism.

BACKGROUND

Usage of video cameras for surveillance or other tasks in residential and commercial environments has increased substantially, in part due to lower costs, the prevalence of sophisticated mobile devices having remote monitoring and control capabilities, and the increased availability of connectivity bandwidth. As consumer demands change and the complexity of home automation and related systems increases, various new challenges arise in designing such camera products.

Many home security cameras, for example, need to be affixed to a surface to ensure stability, but the installation of these cameras is often complex and cumbersome, especially if the cameras need to be positioned high on a ceiling or wall. A security camera can weigh several pounds, and a user may require the use of both hands and various tools to properly affix the camera to the desired location and/or adjust the camera's orientation. For instance, a camera may include one or more separate set screws, clamps, or other mechanisms which must be loosened and retightened each time the user reorients the camera. This may be difficult to accomplish, for example, while trying to maintain balance on a ladder.

Additional challenges arise when the cameras are intended for outdoor use. The cameras may be exposed, for example, to moisture, precipitation, or other environmental elements that could damage the cameras. The cameras may also face vandalism, tampering, or theft. Further difficulties arise in the physical connectivity—exposed or external wiring connecting to the cameras (e.g., power/data cables) may not only be cut or damaged, but often creates undesirable visual appearances and can limit the range of motion of the camera.

SUMMARY

The present invention according to some implementations addresses the above needs and desires by providing a mount for cameras or other electronic devices. In some implementations, the mount according to the present invention allows the camera or other electronic device to be easily attached to a surface (e.g., wall or ceiling) and easily oriented with at least three degrees of motion. In some implementations, a mount according to the present invention allows the camera or other electronic device to be oriented by a user by hand without the use of or need for separate tools. In some implementations, the mount also provide a reliable and visually hidden routing path for electrical wiring for the camera (e.g., for transmission of power and electrical signals) in a wide range of camera orientations.

In some implementations, the present invention provides an attachment mechanism for mounting an electronic device to a surface. In some implementations, the attachment mechanism includes a mounting plate configured to attach to the surface, the mounting plate having at least one projection, and a base configured to releasably couple to the mounting plate. In some implementations, the base includes a first biasing member and a first arm pivotably coupled to the base and biased toward a first direction by the first biasing member, the first arm being configured to interlock with the at least one projection when the base is coupled to the mounting plate. In some implementations, the first arm is concealed by the base and the mounting plate when the base is coupled to the mounting plate. The base, in some implementations, further includes a release mechanism coupled to the first arm such that actuation of the release mechanism when the base is coupled to the mounting plate in a secured engagement causes movement of the first arm in a second direction to disengage the first arm from the at least one projection to enable detachment of the base from the mounting plate.

In some implementations, the base may further include a second arm that is configured to interlock with the at least one projection when the base is coupled to the mounting plate. In some implementations, the base includes a second biasing member which biases the second arm toward the first arm. In further implementations, actuation of the release mechanism when the base is coupled to the mounting plate in a secured engagement causes movement of the second arm away from the at least one projection to enable detachment of the base from the mounting plate. In some implementations, the first arm is pivotable about a first axis and includes a first lever, the second arm is pivotable about a second axis and includes a second lever, and the release mechanism includes a cam pivotable about a third axis, the cam being configured to apply a force on the first lever and the first lever being configured to apply a force to the second lever when the release mechanism is actuated.

In some implementations, a separate tool is required to actuate the release mechanism. In some implementations, the cam is coupled to a keyed opening configured to receive a tool through an external surface of the base. In some implementations, only a tool having a specific, predetermined shape may be received within the keyed opening. In some implementations, the release mechanism is configured to be actuated when the tool is rotated while received within the keyed opening. In some such implementations, the cam is configured to pivot about the third axis as the tool is rotated while received within the keyed opening, causing a portion of the cam to push the first lever against the second lever and causing the first arm and the second arm to pivot away from each other.

In some implementations, the first biasing member is configured to apply a force to an outer side of the first arm. In some implementations, the first arm further includes an inner side that is opposite the outer side, the inner side having an engagement edge configured to contact the at least one projection when the base is coupled to the mounting plate. In some implementations, the engagement edge includes a beveled or chamfered surface that is shaped and configured to translate a force impinging on the beveled or chamfered surface into a lateral force to move the first arm in the second direction. In further implementations, the at least one projection includes a beveled or radiused surface which is configured to contact the beveled or chamfered surface of the engagement edge when the base is being coupled to the mounting plate.

In some implementations, the at least one projection defines a groove, the engagement edge being configured to be received within the groove when the base is coupled to the mounting plate. In some implementations, the release mechanism is configured to cause the engagement edge to separate from the groove when the release mechanism is actuated. In some implementations, the inner side of the first arm includes a concavely curved portion which at least partially defines an opening for receiving the at least one projection. In some implementations, the concavely curved portion of the first arm is shaped to at least partially fit around and abut against a convexly curved exterior contour of the at least one projection. In some implementations, the mounting plate includes an cable opening sized to receive one or more electronic cables, and the at least one projection includes a wall that is positioned at least partially around the cable opening.

In some implementations, the mounting plate further includes one or more keyed features which are configured to mate with one or more corresponding features on the base when the base is coupled to the mounting plate. In some implementations, the one or more keyed features are configured to prevent the base from coupling with the mounting plate if the base is not in one of one or more predetermined orientations with respect to the mounting plate. In some such implementations, when the base is in one of the one or more predetermined orientations with respect to the mounting plate, the base is configured to be coupled to the mounting plate through a linear movement of the base toward the mounting plate in a direction that is substantially perpendicular to the surface.

In further implementations, the present invention provides a camera including an attachment mechanism as described herein. In some implementations, a camera for mounting onto a surface according to the present invention includes a head portion having a housing containing a camera module, a mounting plate configured to attach to the surface, the mounting plate having at least one projection, and a base connected to the head portion and configured to releasably couple to the mounting plate. In some implementations, the base includes a first biasing member and a first arm pivotably coupled to the base and biased toward a first direction by the first biasing member, the first arm configured to interlock with the at least one projection when the base is coupled to the mounting plate. In some implementations, the first arm is concealed by the base and the mounting plate when the base is coupled to the mounting plate. In some implementations, the base may further include a second arm that is configured to interlock with the at least one projection when the base is coupled to the mounting plate. In some implementations, the base includes a second biasing member which biases the second arm toward the first arm. In further implementations, the camera may include a release mechanism configured such that actuation of the release mechanism when the base is coupled to the mounting plate in a secured engagement causes movement of the first arm and/or second arm to disengage from the at least one projection to enable detachment of the base from the mounting plate. In some such implementations, actuation of the release mechanism causes the first arm and the second arm to pivot away from each other. In yet further implementations, the camera includes a hinge assembly connecting the head portion to the base, the hinge assembly configured to allow the head portion to move relative to the base in at least two degrees of freedom.

BRIEF DESCRIPTION OF THE DRAWINGS

For a better understanding of the various described implementations, reference should be made to the Detailed Description of implementations below, in conjunction with the following drawings in which like reference numerals refer to corresponding parts throughout the figures.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1A:
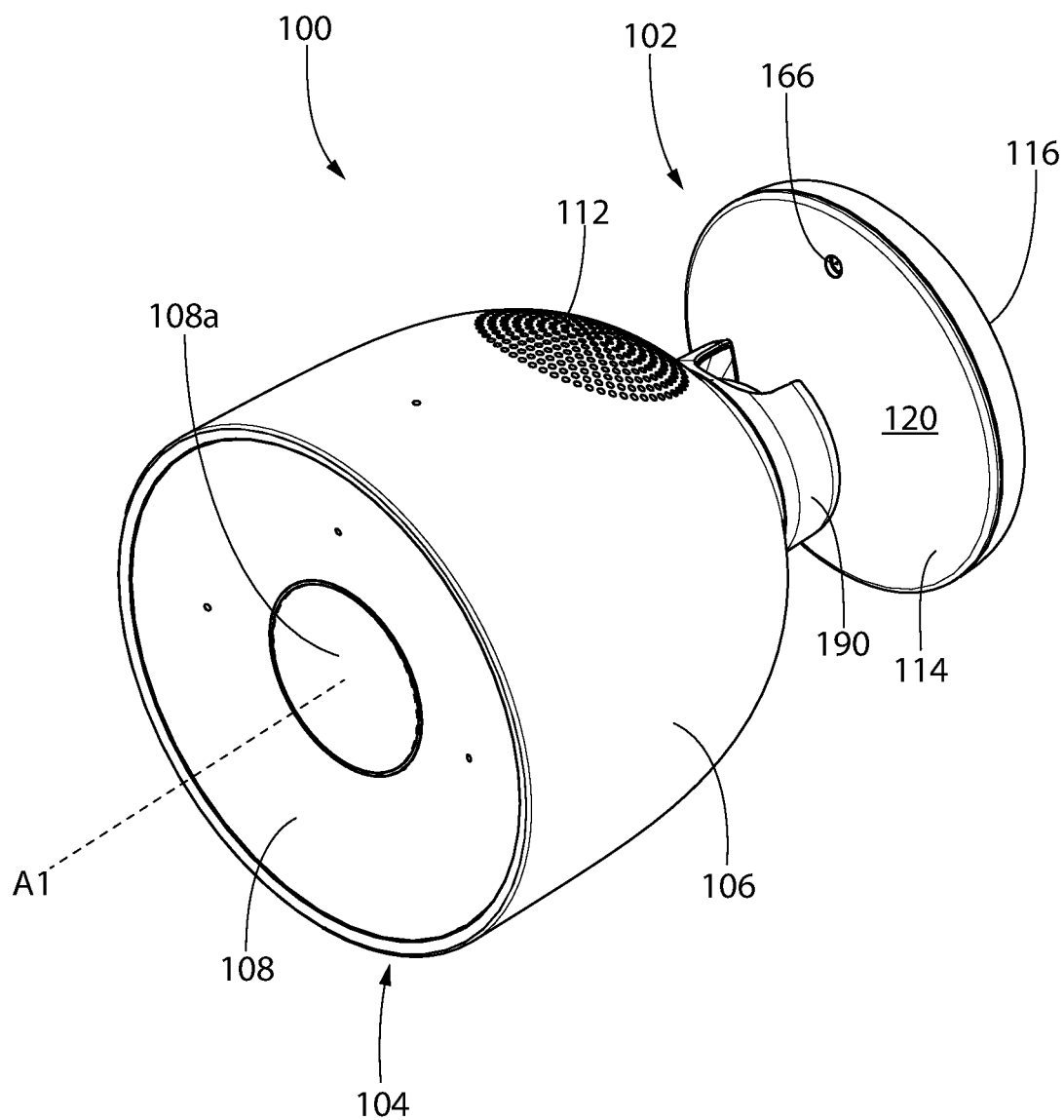
FIG. 1A shows a perspective view of a system including an electronic device (e.g., a camera module) with a mount in accordance with some implementations of the present invention.
Figure 1B:
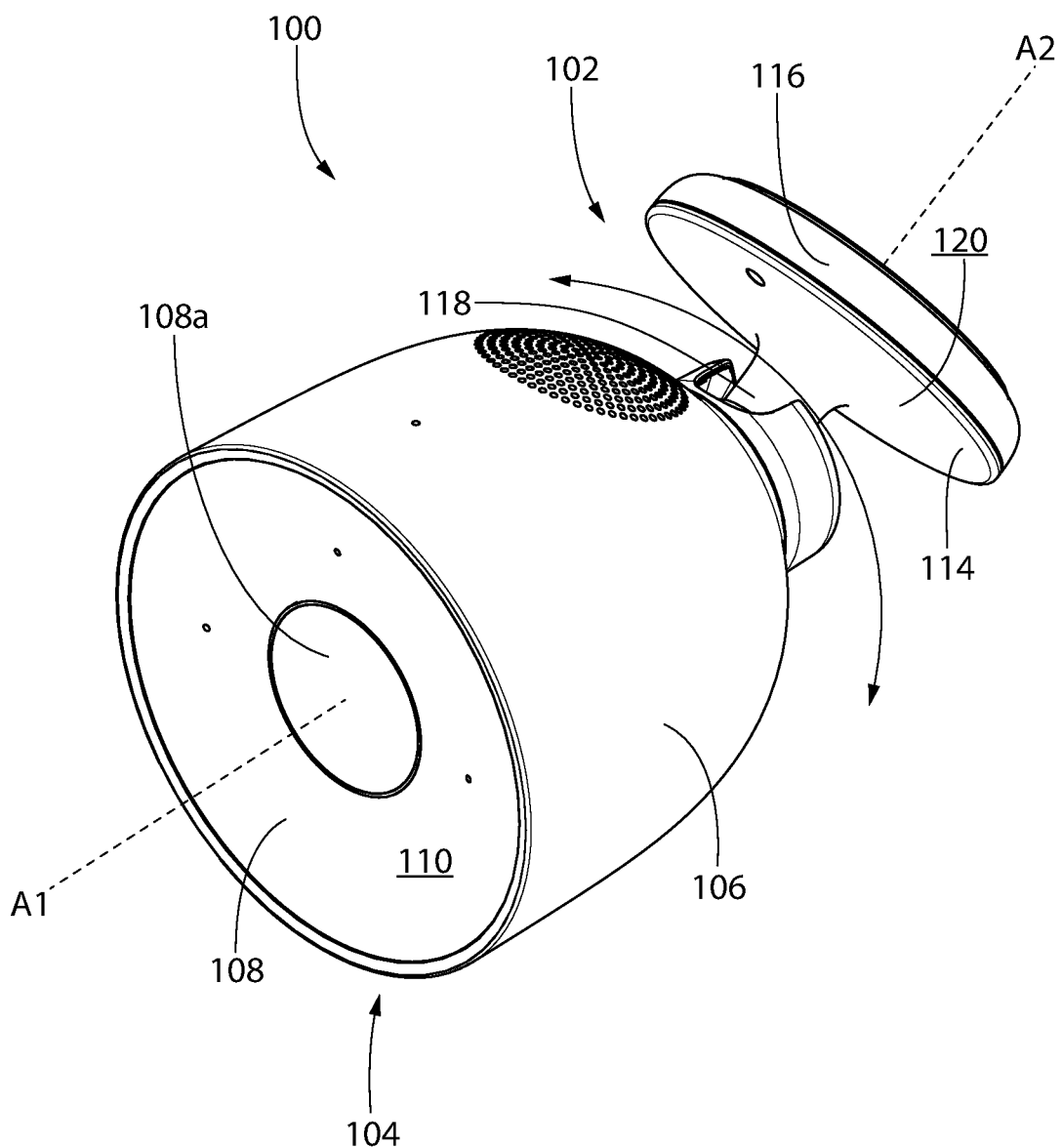
FIG. 1B shows a perspective view of the system of FIG. 1A where the electronic device in a tilted positioned in accordance with some implementations of the present invention.
Figure 1C:
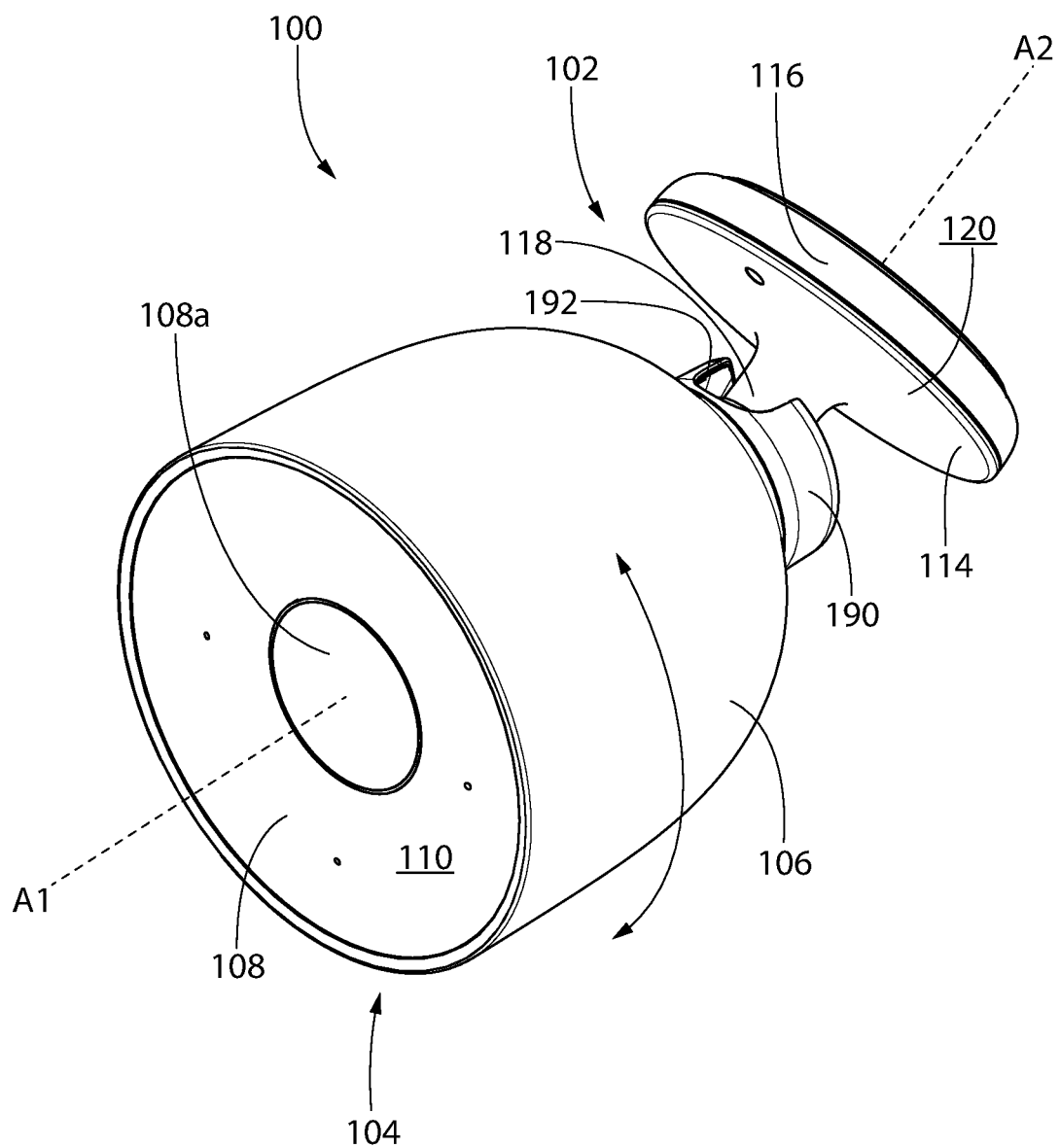
FIG. 1C shows a perspective view of the system of FIG. 1A where the electronic device in a tilted and rotated positioned in accordance with some implementations of the present invention.

Referring to the drawings in detail, wherein like reference numerals indicate like elements throughout, there is shown in FIGS. 1A-1C a system 100, which may be a camera system according to some implementations, which generally includes a mount 102 connected to a head portion 104 which includes an electronic device. In some implementations, head portion 104 is or includes a camera which is configured to capture video and/or still photographs. In some implementations, system 100 may be used as a component of a residential or commercial surveillance system, for example. In some implementations, head portion 104 alternatively or additional includes one or more audio devices (e.g., speaker, microphone). In further implementations, head portion 104 additionally or alternatively includes a light source (e.g., light bulb, light emitting diodes, laser, etc.). Other electronic devices may also be included in head portion 104 according to further implementations. In alternative embodiments, the system 100 is primarily, or exclusively, a speaker, microphone, sensor, and/or light system.

Head portion 104, in some implementations, includes a housing 106 which surrounds and protects the internal components of the electronic device. In some implementations where head portion 104 is or includes a camera, the various components of the camera (e.g., CPU(s), memory, data input device(s), data output device(s), lens assemblies, heat sink(s), image sensor array(s), infrared illuminator(s), filter(s), etc.) may be enclosed within housing 106. In some implementations, housing 106 may include a generally cup-shaped shell which surrounds and defines an interior space in which the electronic device or components thereof may be housed. Housing 106 may have a continuously convexly curved exterior surface which defines an exterior surface of head portion 104. In some implementations, for example, housing 106 may be bell-shaped or include a shape such as a circular paraboloid. Other shapes for housing 106 may also be utilized according to alternatively implementations.

In some implementations, housing 106 may include a shape that is generally symmetric about a central axis A1 of head portion 104. Where head portion 104 includes a camera, the central axis A1 of head portion 104 may be coaxial with an optical axis of the camera. The optical axis of the camera may refer to the axis about which the one or more lenses of the camera are centered. In some implementations, head portion 104 further includes a front element 108 which is sized and shaped to fit or substantially fill a front end of housing 106. In some implementations, front element 108 is secured to the front end of housing 106 with a water resistant or waterproof seal. In some implementations, where head portion 104 is or includes a camera, front element 108 may be positioned at a front end of the camera and be positioned to face the subject being videoed and/or photographed by the camera during use. In further implementations, housing 106 includes a speaker and/or microphone grille 112 to allow transmission of sound to or from the electronic device in head portion 104.

Front element 108 may be, in some implementations, at least partially constructed from a solid transparent material, for example, glass or transparent plastic. In some implementations, front element 108 is or includes an optical lens element of a camera. In some implementations, front element 108 may be provided with one or more coatings or layers, for example, a scratch-resistant coating, anti-glare coating, anti-reflective coating, a printed coating, etc. In some implementations, front element 108 is or at least partially made from a thermally conductive material which is configured to help dissipate heat from the electronics housed within head portion 104. In some implementations, front element 108 may include a thermally conductive plastic or composite material. For example, in some implementations, front element 108 includes a plastic material that contains thermally conductive fillers or powders.

In some implementations, a front exterior surface 110 of front element 108 may be flat or alternatively have a curved contour. In some implementations, front exterior surface 110 is a substantially smooth surface. In some implementations, front exterior surface 110 has a concave contour such that a perimeter of front exterior surface 110 extends further forward than a center of front exterior surface 110. In some such implementations, where system 100 is a camera system, having a front exterior surface 110 with a concave contour may provide a degree of shading to prevent or reduce glare/lens flare, similar to a lens hood. In some implementations, where head portion 104 is oriented to face a generally downward direction, having a concave contour may help cause water on front exterior surface 110 to move away from the center of front exterior surface 110, where the water could obscure the camera, and towards the perimeter.

In certain implementations, head portion 104 may include one or more lights (e.g., LEDs) which are configured to emit light through front element 108. In some implementations, the one or more lights may be configured to emit different colors which, for example, may be indicative of a status or operational mode of system 100. In some embodiments, the one or more lights are arranged to emit light proximate the perimeter of front element 108, for example, to produce a ring of light around a central portion 108a of front element 108. In some implementations, front element 108 may be configured to diffuse or soften the light emitted by the one or more lights. In some embodiments, front element 108 includes a central portion 108a which is not configured to diffuse or scatter light, and an outer portion around the central portion which is configured to diffuse or scatter light. Central portion 108a is disposed about central axis A1 (e.g., coaxial with an optical axis of the camera) according to some implementations.

In some implementations, head portion 104 is configured to be affixed to a solid surface (e.g., building wall, ceiling, overhang, column, etc.) by mount 102. In some implementations, mount 102 includes a base assembly 114 which engages with a mounting plate 116 that in turn can be affixed to the solid surface. In some implementations, base assembly 114 is attached to head portion 104 by a hinge assembly configured to allow head portion 104 to move relative to base assembly 114, which will be described in more detail herein. In some implementations, head portion 104 is configured to move relative to base assembly 114 in at least one degree of freedom. In some implementations, head portion 104 is configured to move relative to base assembly 114 in at least two degrees of freedom. In some implementations, head portion 104 is configured to move relative to base assembly 114 in three or at least three degrees of freedom.

In some implementations, base assembly 114 includes a stem 118 which extends from external surface 120 and to which head portion 104 is connected by the hinge assembly. Stem 118 may extend perpendicularly from a portion of external surface 120 (e.g., a central portion) according to some implementations. In some implementations, stem 118 is disposed about and extends along an axis A2. In some implementations, head portion 104 is configured to tilt and/or rotate respect to stem 118, as depicted by the arrows shown in FIG. 1B. In some embodiments, head portion 104 is configured to tilt with respect to stem 118 with a range of motion between 45° to 90°, 50° to 85°, 55° to 80°, 60° to 75°, or 65° to 70°. In some implementations, head portion 104 is further configured to rotate relative to a collar 190 about the central axis A1 of head portion 104 (e.g., clocking motion), as depicted by the arrows shown in FIG. 1C as discussed in further detail below. As mentioned previously, where head portion 104 includes a camera, the central axis A1 of head portion 104 may be coaxial with the optical axis of the camera. In some implementations, head portion 104 may rotate about the central axis A1 of head portion 104 with no limit to the range of rotation.

In some implementations, system 100 is configured to electronically connect with an external electronic device (not shown), which may be, for example, an electronic power source, computer, portable electronic device, component of a smart home network, etc. In some implementations, system 100 is configured to communicate data with one or more smart devices, a central server or cloud-computing system, and/or other devices that are network-connected. In some such implementations, system 100 is configured to electronically connect with the external electronic device through a wired connection (e.g., a USB cable) that passes through mounting plate 116 and into base assembly 114. The wired connection may allow both power and data transmission between the external electronic device and system 100. In certain implementations, as will be described further herein, the connection of system 100 to any cables may be concealed. In some implementations, concealing the cable may help protect the cables and prevent tampering and disablement of system 100 during use.

In other implementations, system 100 may be a wireless system such that a physical wired connection between system 100 and the external device is not required. In some such implementations, system 100 may include a self-contained battery or energy storage device (e.g., batter) capable of providing power to electronic components of system 100. In further implementations, system 100 includes modules for the wireless transmission of data to the external device. In some implementations, system 100 is configured to wirelessly communicate data with one or more smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth, ISA100.11a, WirelessHART, MiWi, etc.) and/or any of a variety of custom or standard wired protocols (e.g., Ethernet, HomePlug, etc.), or any other suitable communication protocol.

Figure 2:
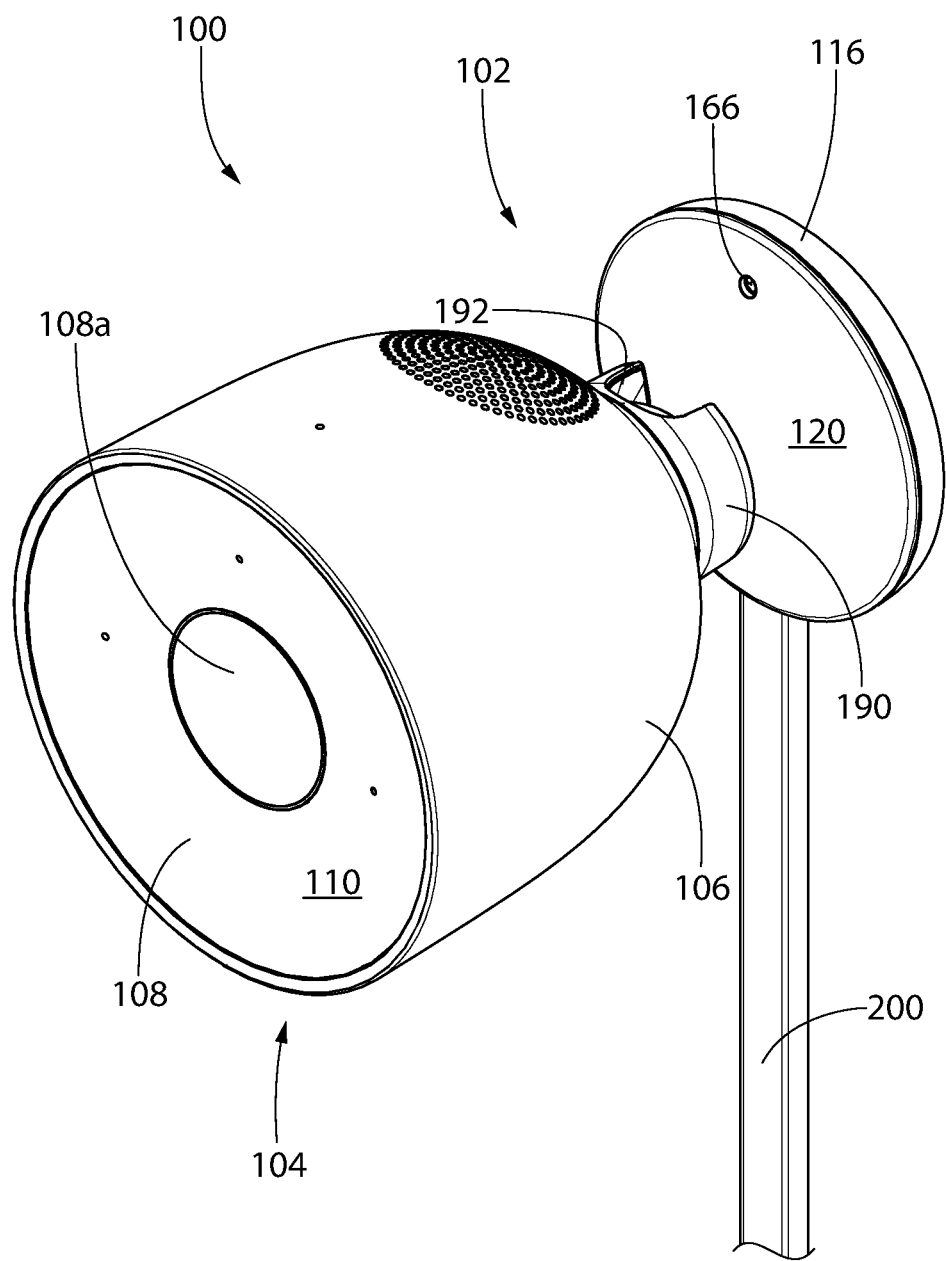
FIG. 2 shows a perspective view of the system of FIG. 1A connected to a cable in accordance with some implementations of the present invention.
Figure 3:
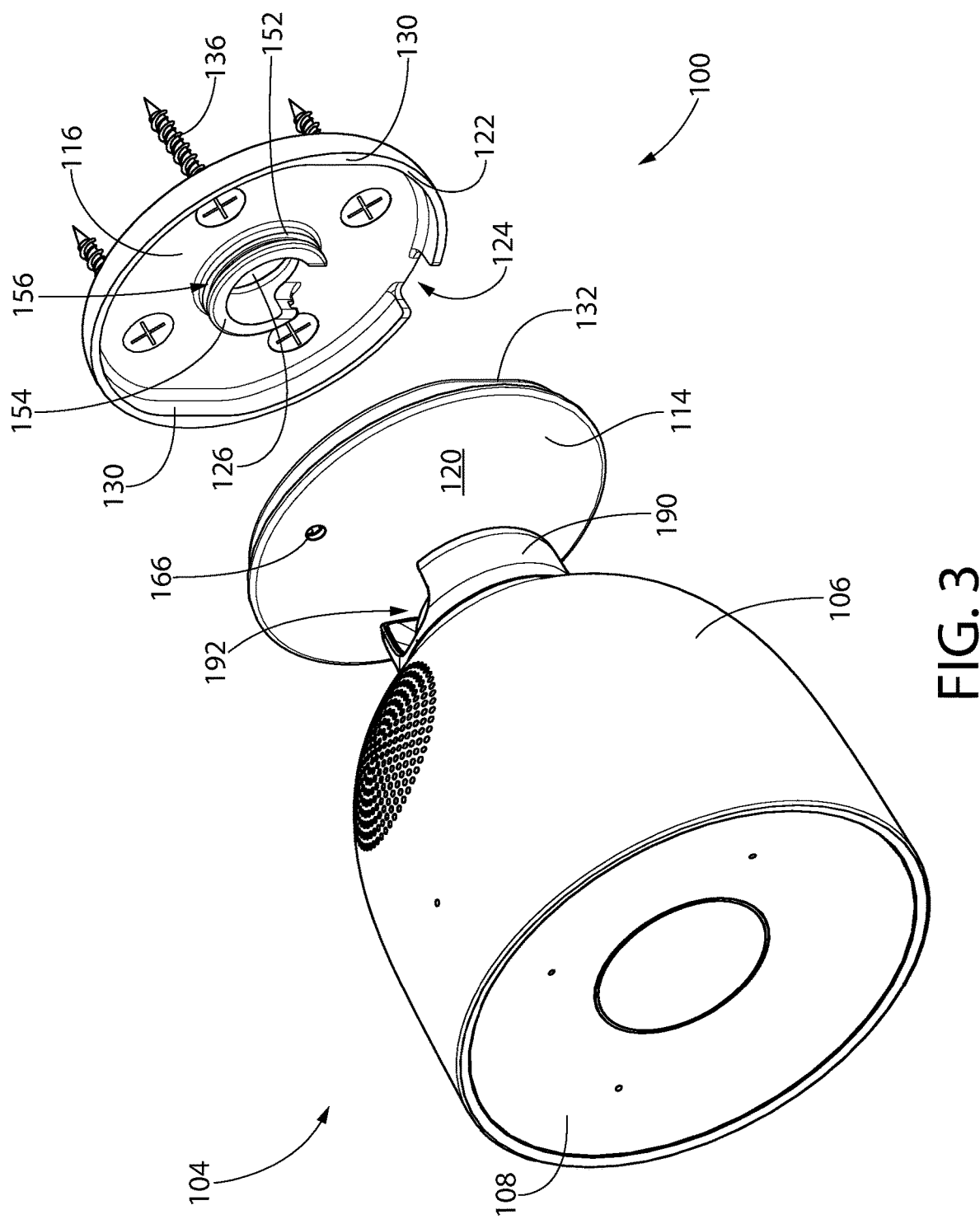
FIG. 3 shows an exploded front perspective view of the system of FIG. 1A with the mounting plate separated from the base assembly and provided with fasteners in accordance with some implementations of the present invention.
Figure 4:
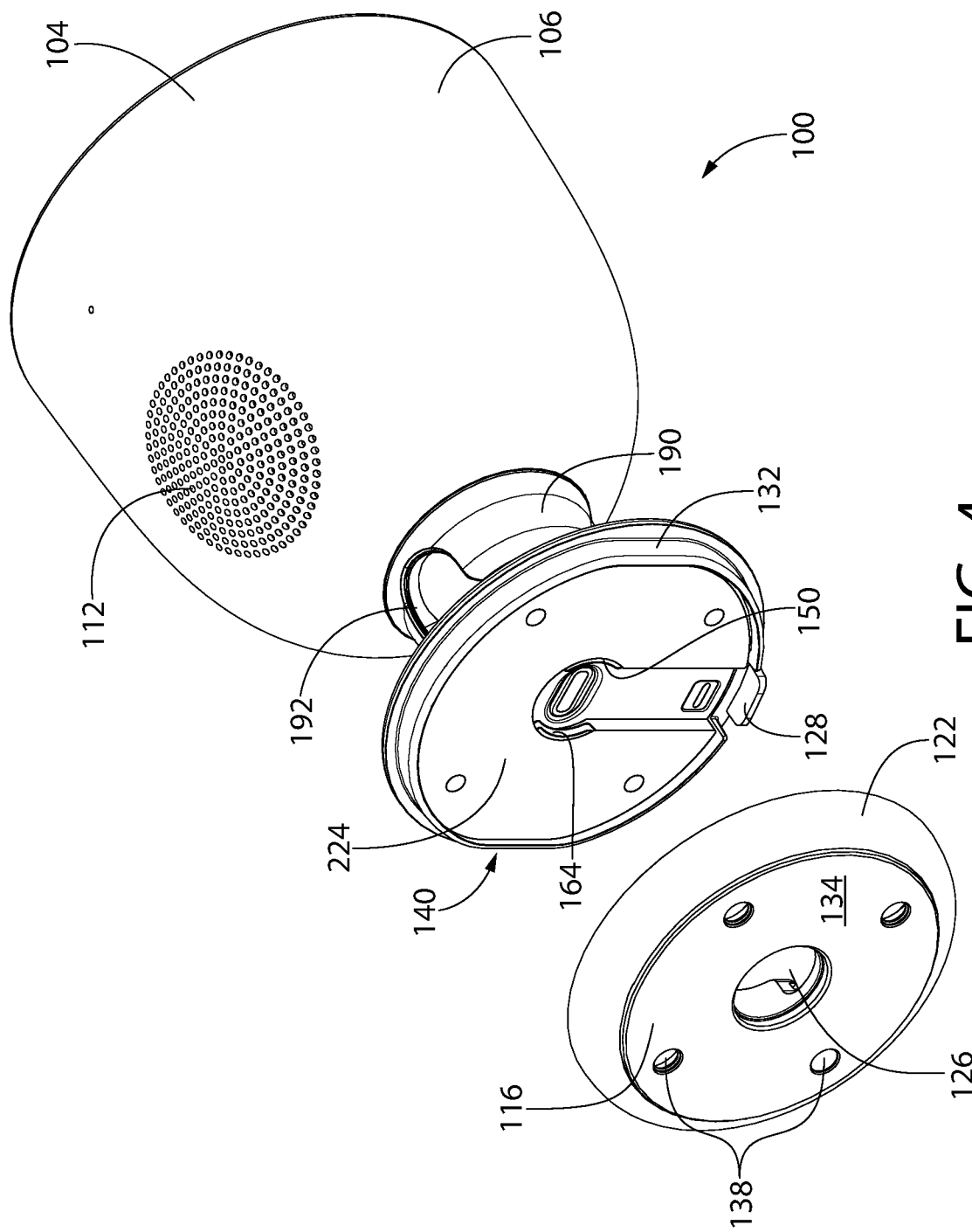
FIG. 4 shows an exploded rear perspective view of the system of FIG. 1A with the mounting plate separated from the base assembly in accordance with some implementations of the present invention.
Figure 5:
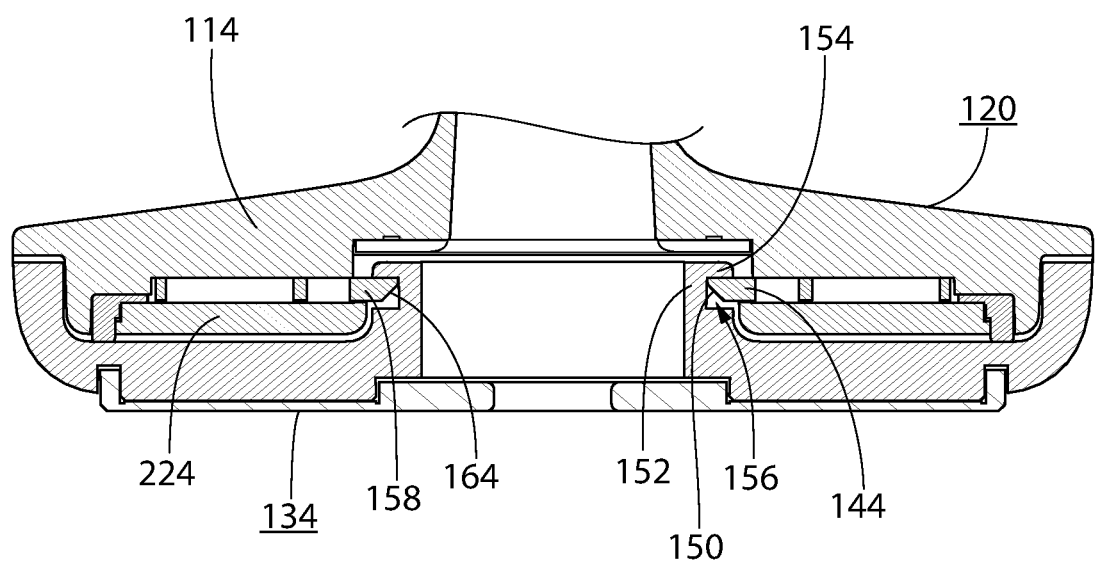
FIG. 5 shows a cross-sectional view of the base assembly of the system of FIG. 1A coupled to the mounting plate in accordance with some implementations of the present invention.
Figure 8:
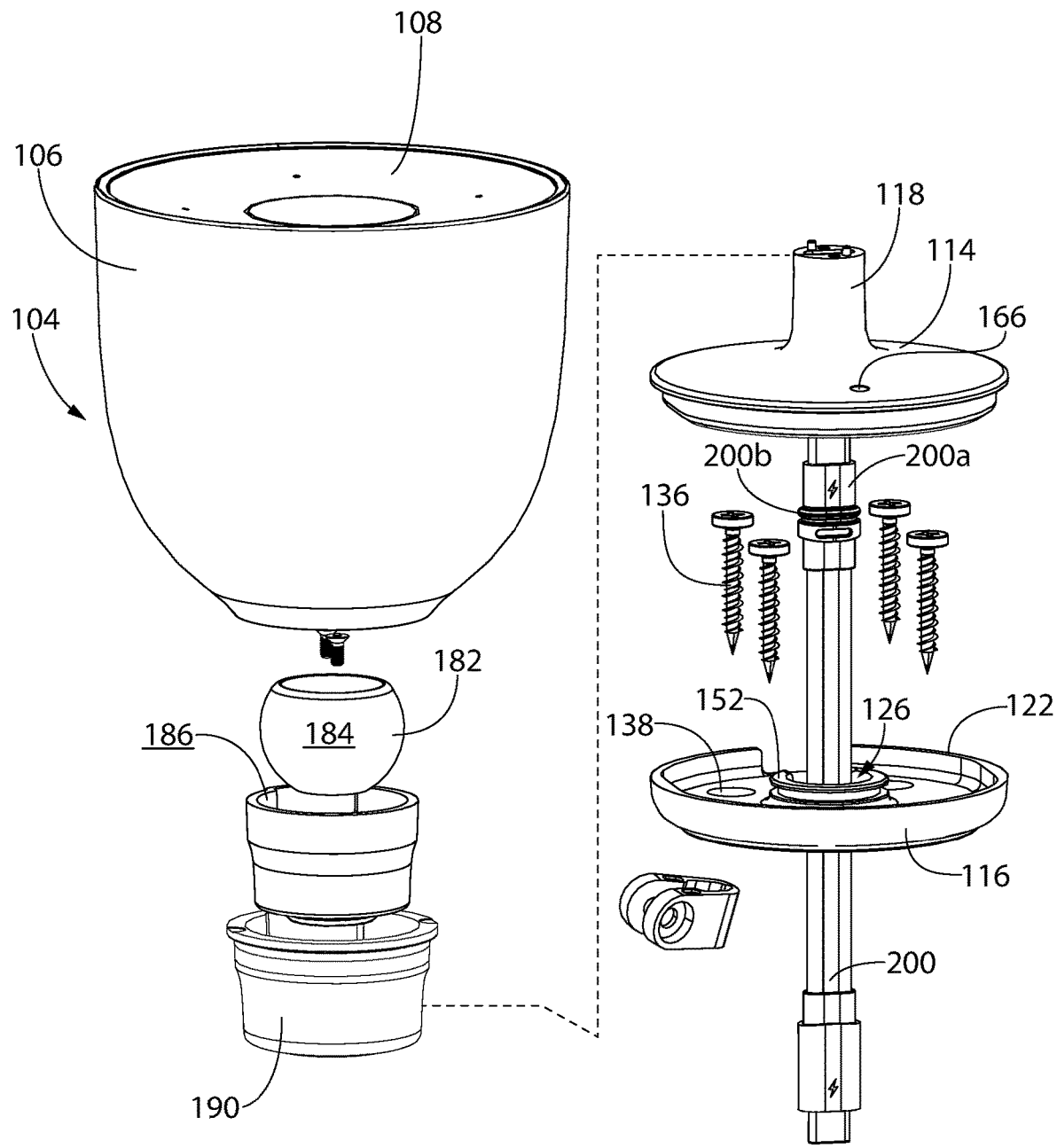
FIG. 8 is an exploded view of components of the system of FIG. 1A in accordance with some implementations of the present invention.

Referring again to the illustrated implementations, in some configurations mounting plate 116 defines at least two openings to allow a cable to be received into system 100. With particular reference to FIGS. 2-4, in some implementations mounting plate 116 includes a circumferential wall 122 having a gap or lateral opening 124 which is sized and configured to receive a cable 200 therethrough. In some implementations, it may be useful to pass cable 200 through lateral opening 124 where, for example, the user chooses to position cable 200 along the wall or other surface to which system 100 is to be affixed. Cable 200 may be further concealed in a wire duct or other tubing that can be secured to the wall or other surface. In some implementations, where the cable can be routed through the wall or other surface, the cable 200 may be passed through a back surface 134 of mounting plate 116 through back opening 126 (as illustrated in FIG. 8) and routed into base assembly 114 and into stem 118, which may include a connector for the cable 200. In some implementations, back opening 126 is positioned at or about a center of back surface 134 of mounting plate 116. In certain implementations, back opening 126 may be positioned offset from the center of back surface 134. In some implementations, where the cable 200 may be routed through back opening 126 rather than lateral opening 124, it may be useful to close lateral opening 124 so as to prevent water or other unwanted material from entering the space between mounting plate 116 and base assembly 114 through lateral opening 124. In some implementations, base assembly 114 may be engaged with mounting plate 116 in at least two different orientations. In a first orientation, base assembly 114 may be engaged with mounting plate 116 such that lateral opening 124 remains open. In a second orientation, base assembly 114 may be engaged with mounting plate 116 such that lateral opening 124 is closed. In some implementations, for example, base assembly 114 includes a tab or other projection 128 which is positioned to close lateral opening 124 when base assembly 114 is engaged with mounting plate 116 in the second orientation. Base assembly 114 may be rotated (e.g., by 180°) from the first orientation to the second orientation according to some implementations, for example, prior to engaging base assembly 114 with mounting plate 116.

In some implementations, mounting plate 116 may be secured to a wall, ceiling, or other location where system 100 is to be mounted before engagement with base assembly 114. In some implementations, back surface 134 of mounting plate 116 may be positioned to abut against the wall or other surface at the desired location and can be secured thereto using one or more mechanical fasteners 136 (e.g., screws, nails, bolts, pins, etc.). The one or more fasteners 136 may be received through one or more fastener holes 138 provided on mounting plate 116 which, for example, may be arranged around back opening 126. In some implementations, back opening 126 may be, but not necessarily, positioned centrally between two more of the fastener holes 138. Fasteners 136 may be, in some implementations, screws having heads which are configured to be concealed between mounting plate 116 and base assembly 114. In some implementations, back surface 134 may be provided or coated with an elastomeric material (e.g., silicone, rubber, etc.) that is configured to form a seal and/or provide for vibration absorption against the wall, ceiling, or other surface to which system 100 is to be mounted. In some implementations, back surface 134 may be adhered or secured to the wall or other surface with any other suitable means known to those skilled in the art (e.g., via hook-and-loop fasteners, magnetic fasteners, etc.).

In some implementations, base assembly 114 may engage with mounting plate 116 in only one orientation. In some implementations, base assembly 114 may engage with mounting plate 116 in one of only two different orientations. In some implementations, base assembly 114 may engage with mounting plate 116 in one of two or more different orientations. In some implementations, mounting plate 116 includes one or more keyed features which are configured to mate with one or more corresponding features on base assembly 114 when base assembly is in a proper orientation to allow base assembly 114 to engage with mounting plate 116. The one or more keyed features may prevent base assembly 114 from properly engaging with mounting plate 116 when base assembly 114 is not in an acceptable orientation. In some implementations, the one or more keyed features further prevent base assembly 114 from rotating with respect to mounting plate 116 when base assembly 114 is engaged with mounting plate 116. In the illustrated implementations shown in FIGS. 3 and 4, for instance, mounting plate 116 includes one or more keyed surfaces 130 which are shaped to abut against corresponding surfaces 132 of base assembly 114 when base assembly 114 is in a proper orientation and engaged with mounting plate 116. Keyed surfaces 130 may include substantially flat surfaces positioned internally on circumferential wall 122 according to some such implementations. Corresponding surfaces 132 on base assembly 114 may also include substantially flat surfaces. Circumferential wall 122 may be configured to surround and/or seal against a portion of base assembly 114 having corresponding surfaces 132. Other configurations for keyed surfaces 130 and corresponding surfaces 132 may be used in other implementations.

With reference now to FIG. 4, system 100, in some implementations, includes an attachment mechanism generally designated 140 which is configured to secure base assembly 114 onto mounting plate 116. In some implementations, attachment mechanism 140 is configured to releasably secure base assembly 114 onto mounting plate 116. In some implementations, base assembly 114 may be secured mounting plate 116 through a first motion by the user, and unsecured from the mounting plate through a second motion by the user. The second motion, in some implementations, is different than the first motion and/or different than a reverse of the first motion. In some implementations, for example, base assembly 114 is configured to be securely engaged with mounting plate 116 by pressing base assembly 114 into mounting plate 116 in a linear motion along a first direction that is or substantially is perpendicular to back surface 134, whereas base assembly 114 is configured to be disengaged from mounting plate 116 through a different second motion (e.g., a rotational motion). In some implementations, attachment mechanism 140 is configured to allow base assembly 114 to be securely engaged to mounting plate 116 without the need or use of any tools. In some implementations, attachment mechanism 140 is configured to allow base assembly 114 to be disengaged from mounting plate 116 only through the use of one or more separate tools. In some implementations, attachment mechanism 140 is configured to allow base assembly 114 to form a snap-fit engagement with mounting plate 116. In some implementations, attachment mechanism is positioned on base assembly 114 and configured to engage with a feature of mounting plate 116. In some such implementations, attachment mechanism 140 is positioned on a mounting surface 142 (FIG. 6A) of base assembly 114 which is opposite of external surface 120. In some implementations, components of attachment mechanism 140 may be concealed or at least partially concealed within base assembly 114 by a base plate 224. In some implementations, attachment mechanism 140 may be positioned within base assembly 114 between external surface 120 and base plate 224. In some implementations, base plate 224 includes an opening which is sized and configured to receive a projection of mounting plate 116 therethrough which engages with attachment mechanism 140 to secure base assembly 114 to mounting plate 116. In some implementations, engagement edges 150 and/or 164 of attachment mechanism 140 may be accessible through the opening in base plate 224 to engage with the projection of mounting plate 116, as will be described further herein. In some implementations, base plate 224 may further include or define a passageway for routing an electronic cable (e.g., cable 200). In certain alternative implementations, attachment mechanism 140 may be positioned on mounting plate 116 and configured to engage with a feature of base assembly 114. In some implementations, attachment mechanism 140 may be completely positioned and/or concealed between external surface 120 of base assembly and back surface 134 of mounting plate 116 when base assembly 114 is securely engaged with mounting plate 116.

Referring to FIGS. 3-6B, further details of attachment mechanism 140 according to certain exemplary implementations will be now be described. Base plate 224 is not included in FIGS. 6A and 6B for clarity. In certain implementations, attachment mechanism 140 includes a first arm 144 which is mounted onto base assembly 114 and rotatable about a first pivot 146. First arm 144 may rotate around first pivot 160 about an axis of first pivot 160 that is perpendicular to mounting surface 142. First arm 144 may be configured to rotate about first pivot 146 in a plane that is parallel to or generally parallel to mounting surface 142. In some implementations, a first biasing member 148 is further positioned and configured to bias first arm 144 in a first rotational direction about first pivot 146. First biasing member 148 may be a spring, for example, a wire form spring, compression spring, torsion spring, leaf spring, cantilever spring, etc. In one embodiment, the first biasing member 148 is a wire form spring that is generally U-shaped with one end (e.g., a securely fixed end) coupled to the attachment mechanism 140 and another end (e.g., a movable free end) coupled to the first arm 144. In some implementations, first arm 144 includes an engagement edge 150 which is configured to contact a portion of mounting plate 116 when base assembly 114 is being engaged with mounting plate 116. As discussed, in some implementations, base assembly 114 may be engaged with mounting plate 116 by aligning the one or more keyed features of mounting plate 116 (e.g., keyed surfaces 130) with the corresponding features of base assembly 114 (e.g., corresponding surfaces 132) and linearly translating base assembly 114 towards mounting plate 116 in a direction that is substantially perpendicular to back surface 134.

In some implementations, during engagement of base assembly 114 with mounting plate 116, engagement edge 150 is configured to contact a component of mounting plate 116. In some implementations, first arm 144 is configured to clamp against the component of mounting plate 116 in order to secure base assembly 114 to mounting plate 116. In some such implementations, first biasing member 148 may be configured and arranged to bias engagement edge 150 towards the component of mounting plate 116. Engagement edge 150 may be positioned on an inner side of first arm 144 according to some implementations, and first biasing member 148 may be positioned to apply a force to an outer side of first arm 144 that is opposite the inner side.

In some implementations, engagement edge 150 is configured to contact an inner wall 152 of mounting plate 116 which surrounds, at least partially, back opening 126. In some implementations, inner wall 152 includes a gap or opening which is sized and configured to allow passage of a cable (e.g., cable 200). The gap or opening in inner wall 152 may be radially aligned with lateral opening 124 in circumferential wall 122. In some implementations, inner wall 152 is positioned and configured to prevent first arm 144 from physically blocking back opening 126 when base assembly 114 is securely engaged with mounting plate 116. In some implementations, first arm 144 is configured to clamp around or onto inner wall 152 when base assembly 114 is securely engaged with mounting plate 116. In some implementations, first biasing member 148 is configured to bias first arm 144 towards inner wall 152 when base assembly 114 is securely engaged with mounting plate 116. First biasing member 148, in some implementations, is positioned and configured to contact the outer side of first arm 144 that is opposite the inner side of first arm 144. In some implementations, inner wall 152 has a convexly curved exterior contour (e.g., a circular contour) and first arm 144 has a concavely curved portion located on the inner side of first arm 144 which is configured to fit around and abut against the convexly curved exterior contour of inner wall 152. Engagement edge 150 may be positioned along the concavely curved portion of first arm 144 according to some such implementations. In some implementations, the convexly curved exterior contour of inner wall 152 and the concavely curved portion of first arm 144 have the same or approximately the same radius of curvature. In some implementations, inner wall 152 includes a lip 154 which partially defines a groove 156 along an outer surface of inner wall 152 which is sized to receive first arm 144. Lip 154, in some implementations, extends radially outward from inner wall 152. Groove 156 may be sized and configured to receive at least engagement edge 150 of first arm 144 according to some implementations. In some implementations, first arm 144 is configured to snap fit around lip 154 and groove 156. In some implementations, engagement edge 150 is configured to contact lip 154 which in turn causes first arm 144 to rotate about first pivot 146 and allow first arm 144 to move past lip 154 and be received within groove 156 as base assembly 114 is engaged with mounting plate 116. In some such implementations, engagement edge 150 includes a beveled or chamfered surfaced that is shaped and configured to translate a force impinging on the beveled or chamfered surface into a lateral force to move first arm 144 in a second rotational direction about first pivot 146 that is opposite the first rotational direction. The lateral force should be greater than the biasing force applied to first arm 144 by first biasing member 148 in order to allow first arm 144 to rotate against the biasing force. The beveled or chamfered surface of engagement edge 150 may be positioned to face towards mounting plate 116 (e.g., towards lip 154) when base assembly 114 is being engaged to mounting plate 116. In some implementations, lip 154 may also include an upper beveled or radiused surface which is configured to contact the beveled or chamfered surface of engagement edge 150 and help guide first arm 144 past lip 154. First biasing member 148, in some implementations may bias first arm 144 into groove 156 once first arm 144 moves past lip 154 according to some embodiments. In some implementations, base assembly 114 is securely engaged with mounting plate 116 when first arm 144 is received within groove 156. Lip 154, in some implementations, interlocks with first arm 144 when first arm 144 is received within groove 156 to prevent base assembly 114 from disengaging with mounting plate 116. In some implementations, lip 154 has a lower surface, opposite the upper beveled or radius surface, which is not beveled or radiused. The lower surface of lip 154, in some such implementations, is configured to abut and prevent first arm 144 from being pulled back over lip 154 when first arm 144 is received within groove 156. In some implementations, once first arm 144 is received within groove 156, first arm 144 cannot be pulled back over lip 154 until first arm 144 is first moved (e.g., pivoted) out of groove 156.

In some implementations, attachment mechanism 140 further includes a second arm 158. In some implementations, second arm 158 operates in concert with first arm 144 to clamp onto a component on mounting plate 116, for example, inner wall 152. In some implementations, first arm 144 and second arm 158 are configured to counter-rotate with respect to each other. In some implementations, first arm 144 and second arm 158 may rotate independently of each other. Second arm 158 may be configured to rotate about second pivot 160 in a plane that is parallel to mounting surface 142. Second arm 158 may rotate around second pivot 160 about an axis of second pivot 160 that is perpendicular to mounting surface 142 and parallel to the axis of first pivot 146. In some implementations, a second biasing member 162 is further positioned and configured to bias second arm 158 in a first rotational direction about second pivot 160. In some implementations, second biasing member 162 is configured to bias second arm 158 toward first arm 144, and first biasing member 148 is configured to bias first arm 144 toward second arm 158. Second biasing member 162 may be a spring, for example, a wire form spring, compression spring, torsion spring, leaf spring, cantilever spring, etc. In one embodiment, the first and second biasing members 148, 162 are each a wire form spring that is generally U-shaped with one end (e.g., a securely fixed end) coupled to the attachment mechanism 140 and another end (e.g., a movable free end) coupled to the first arm 144 or the second arm 158. In other implementations, first biasing member 148 and second biasing member 162 may be replaced, for example, by a single biasing member that is configured to bias first arm 144 toward second arm 158. For example, a single biasing member (e.g., compression spring) may be attached to and positioned between first arm 144 and second arm 158 and configured to pull first arm 144 and second arm 158 toward each other.

In some implementations, second arm 158 further includes an engagement edge 164 which is configured to contact a portion of mounting plate 116 (e.g., inner wall 152) when base assembly 114 is being engaged with mounting plate 116. Engagement edge 164 may be positioned on an inner side of second arm 158, according to some implementations, and second biasing member 162 may be positioned to apply a force to an outer side of second arm 158 that is opposite the inner side. In some implementations, the inner side of second arm 158 and the inner side of first arm 144 may generally face each other. In some implementations, second biasing member 162 is configured to bias the inner side of second arm 158 toward the inner side of first arm 144, and first biasing member 148 is configured to bias the inner side of first arm 144 toward the inner side of second arm 158.

Similar to the implementations described above, in certain implementations, during engagement of base assembly 114 with mounting plate 116, engagement edge 164 of second arm 158 is configured to contact inner wall 152 of mounting plate 116. In some implementations, inner wall 152 is positioned and configured to prevent first arm 144 and second arm 158 from physically blocking back opening 126 when base assembly 114 is securely engaged with mounting plate 116. In some implementations, inner wall 152 has a convexly curved exterior contour (e.g., a circular contour) and second arm 158 has a concavely curved portion located on the inner side of second arm 158 which is configured to fit around and abut against the convexly curved exterior contour of inner wall 152. Engagement edge 164 may be positioned along the concavely curved portion of second arm 158 according to some such implementations. In some implementations, the convexly curved exterior contour of inner wall 152 and the concavely curved portion of second arm 158 have the same or approximately the same radius of curvature. In some implementations, the concavely curved portion of first arm 144 and the concavely curved portion of second arm 158 define, at least partially, a central opening that is configured to receive inner wall 152 of mounting plate 116. In some implementations, second arm 158 and first arm 144 are configured to clamp around or onto inner wall 152 when base assembly 114 is securely engaged with mounting plate 116. In some implementations, first biasing member 148 is configured to bias first arm 144 towards a first half or portion of inner wall 152 and second biasing member 162 is configured to bias second arm 158 towards a second half or portion of inner wall 152 when base assembly 114 is securely engaged with mounting plate 116. Second biasing member 162, in some implementations, is positioned and configured to contact the outer side of second arm 158 that is opposite the inner side of second arm 158.

In some implementations, groove 156 of inner wall 152 is sized and configured to receive second arm 158. Groove 156 may be sized and configured to receive at least engagement edge 164 of second arm 158 according to some implementations. In some implementations, second arm 158 is configured to snap fit around lip 154 and groove 156. In some implementations, engagement edge 164 is configured to contact lip 154 which in turn causes second arm 158 to rotate about second pivot 160 and allow second arm 158 to move past lip 154 and be received within groove 156 as base assembly 114 is engaged with mounting plate 116. In some such implementations, engagement edge 164 includes a beveled or chamfered surfaced that is shaped and configured to translate a force impinging on the beveled or chamfered surface into a lateral force to move second arm 158 in a second rotational direction about first pivot 146 that is opposite the first rotational direction. The lateral force should be greater than the biasing force applied to second arm 158 by second biasing member 162 in order to allow second arm 158 to rotate against the biasing force. The beveled or chamfered surface of engagement edge 164 may be positioned to face towards mounting plate 116 (e.g. towards lip 154) when base assembly 114 is being engaged to mounting plate 116. Thus, in some implementations, lip 154 is configured to move second arm 158 and first arm 144 away from each other as base assembly 114 is engaged with mounting plate 116. In some implementations, lip 154 may also include a beveled or radiused edge which is configured to contact the beveled or chamfered surface of engagement edge 164 and help guide second arm 158 past lip 154. Second biasing member 162 may bias second arm 158 into groove 156 once second arm 158 moves past lip 154 according to some implementations. In some implementations, base assembly 114 is securely engaged with mounting plate 116 when both first arm 144 and second arm 158 are received within groove 156. Lip 154, in some implementations, interlocks with first arm 144 and second arm 158 when first arm 144 and second arm 158 are received within groove 156 to prevent base assembly 114 from disengaging with mounting plate 116. The lower surface of lip 154, in some such implementations, is configured to abut and prevent first arm 144 and second arm 158 from being pulled back over lip 154 when first arm 144 and second arm 158 are received within groove 156. In some implementations, once first arm 144 and second arm 158 are received within groove 156, first arm 144 and second arm 158 cannot be pulled back over lip 154 until first arm 144 and second arm 158 are first moved (e.g., pivoted) out of groove 156.

In some implementations, attachment mechanism 140 further includes a release mechanism that is configured to move first arm 144 and/or second arm 158 out of groove 156 to allow base assembly 114 to be disengaged from mounting plate 116. In some implementations, the release mechanism requires a separate tool 300 to actuate. In some implementations, the release mechanism may be accessed by a user through an opening 166 in external surface 120 of base assembly 114. In some implementations, the release mechanism requires the separate tool 300 to be inserted into opening 166 in order to be actuated. In some implementations, the release mechanism requires tool 300 to be inserted into opening 166 and rotated. Similar to a security screw, opening 166 in some implementations may be shaped such that only a tool having a specific predetermined shape (e.g., specific cross-sectional shape) may fit in opening 166 and actuate the release mechanism. Requiring a specific shape for tool 300, particularly a less common shape, may help prevent unauthorized removal of base assembly 114 from mounting plate 116 according to some implementations. In some implementations, the release mechanism may be designed to require a wrench or driver having one of, for example, a hex, torx, square, triangular, pentalobe, polydrive, torq-set, or any other shape known for driving security screws. In some implementations, tool 300 must be a hex key. In some implementations, opening 166 is configured such that a flathead or Phillips screw driver will not be able to actuate the release mechanism.

Figure 6A:
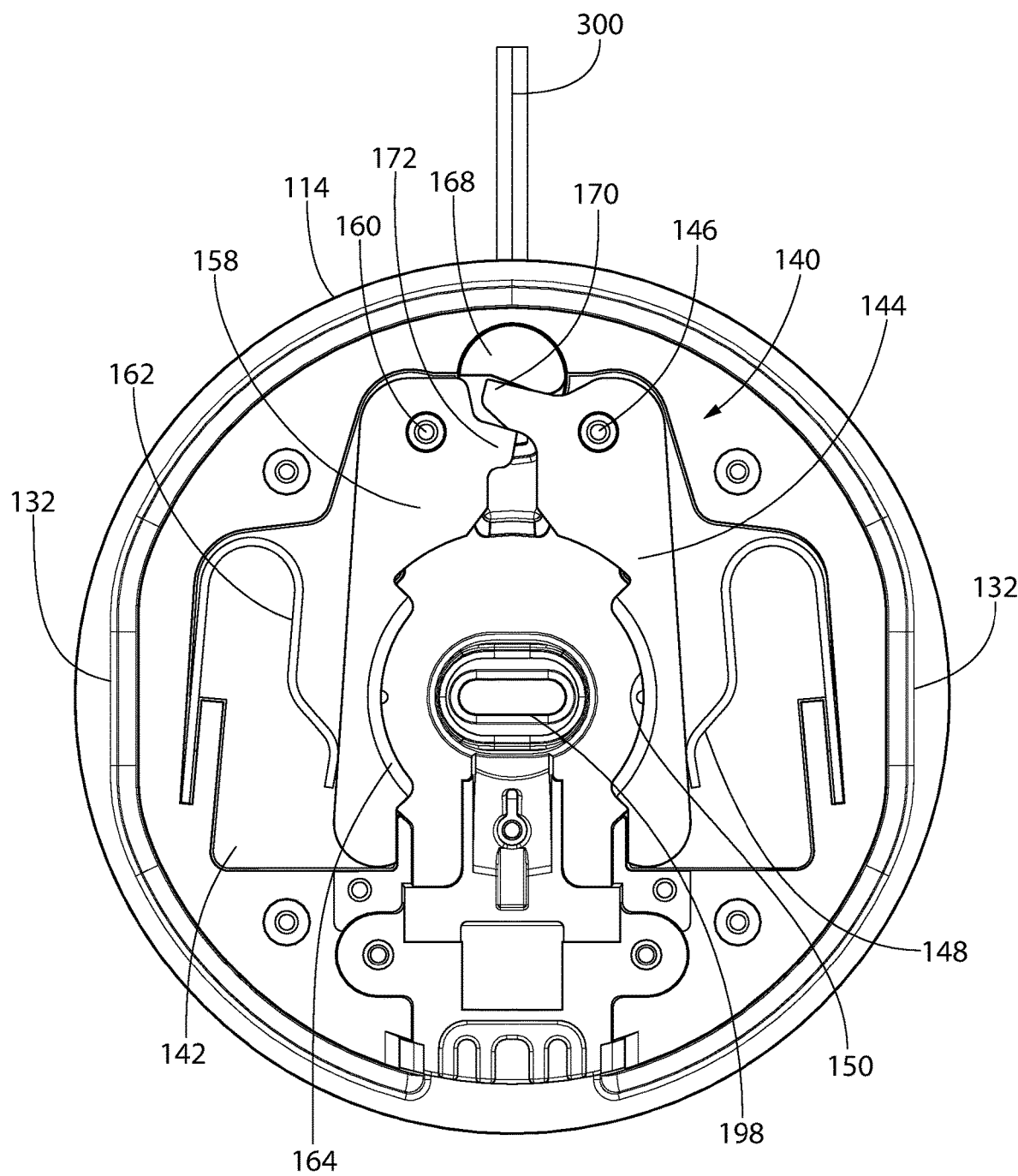
FIG. 6A shows a bottom view of an attachment mechanism of the base assembly of the system in FIG. 1A in a closed configuration and engaged with a tool for opening the attachment mechanism in accordance with some implementations of the present invention.
Figure 6B:
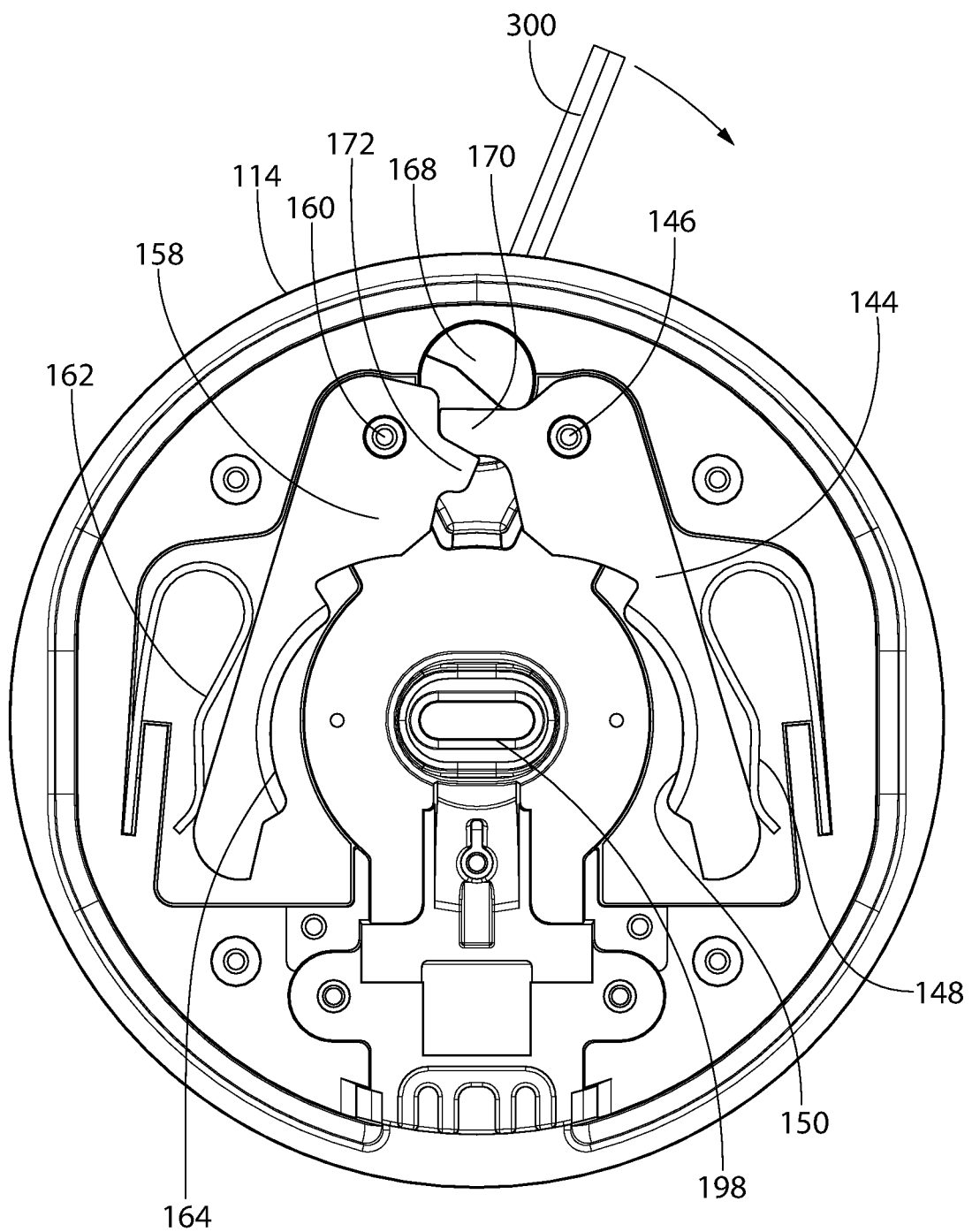
FIG. 6B shows the attachment mechanism of FIG. 6A in an open configuration upon actuation of the tool in accordance with some implementations of the present invention.

Referring particularly to FIGS. 6A and 6B, in some implementations, insertion and rotation of the appropriate tool 300 in opening 166 causes a cam 168 to rotate, which in turn causes first arm 144 and second arm 158 of attachment mechanism 140 to move apart from each other (FIG. 6B). This movement of first arm 144 and second arm 158 allows first arm 144 and second arm 158 to exit from groove 156 and release inner wall 152, permitting separation of base assembly 114 from mounting plate 116 according to some implementations. In some implementations, the rotational force applied to tool 300 by the user is transferred to cam 168 to cause cam 168 to rotate about an axis that may be parallel to the pivot axes of first pivot 146 and second pivot 160. In some implementations, opening 166 on base assembly 114 is positioned about or coaxial with the axis of rotation of cam 168. In some implementations, rotation of cam 168 causes a portion of cam 168 to abut and push against lever 170 that is affixed to or integral with first arm 144, causing first arm 144 to rotate about pivot 146 away from second arm 158. Simultaneously, as lever 170 is pushed by cam 168, lever 170 in turn abuts and pushes against lever 172 that is affixed to or integral with second arm 158, causing second arm 158 to rotate about pivot 160 away from first arm 144. According to some implementations, as first arm 144 and second arm 158 are rotated away from each other, first and second biasing members 148, 162 become compressed and configured to bias first arm 144 and second arm 158 towards each other once the user's force on tool 300 is released.

Figure 7A:
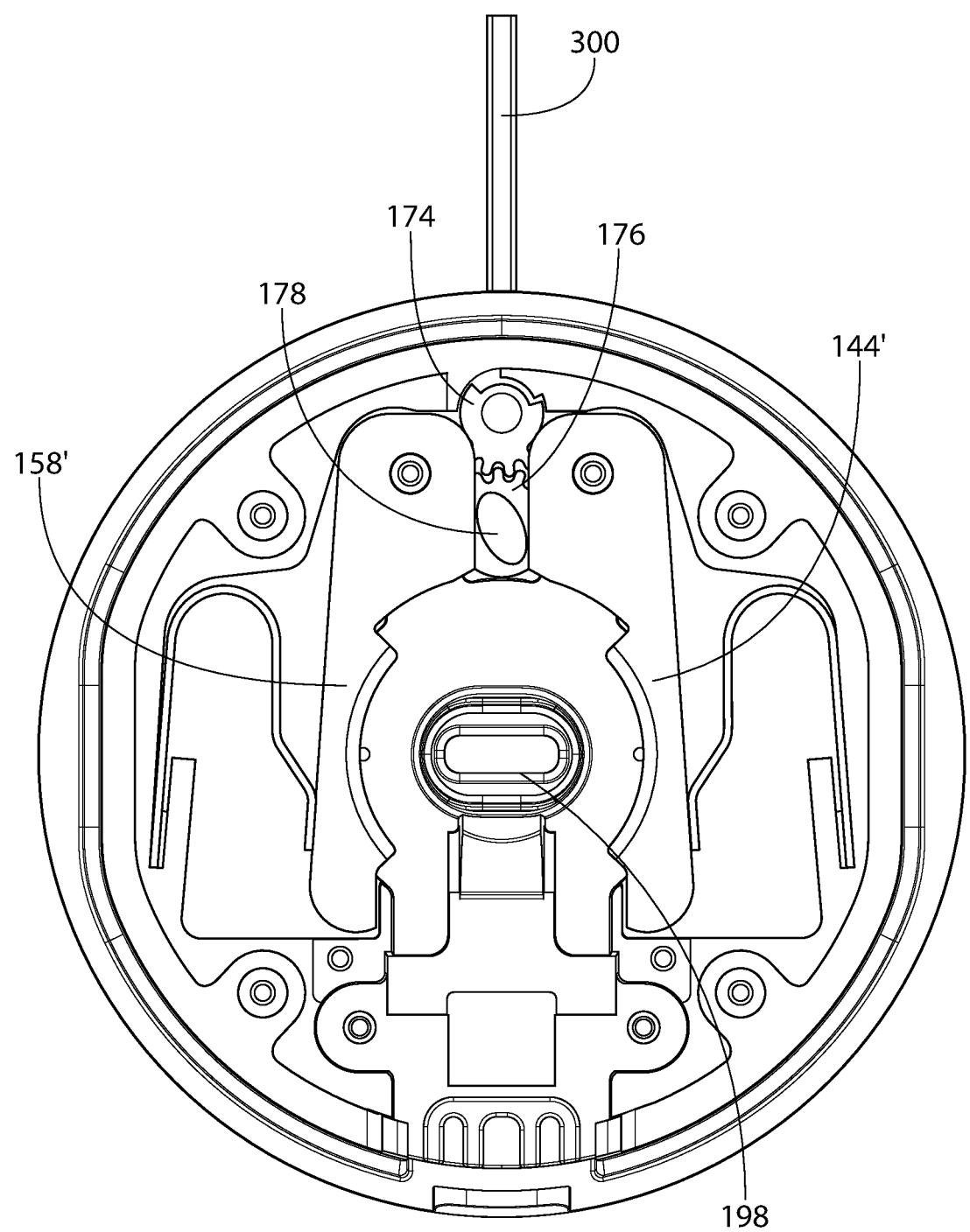
FIG. 7A shows a bottom view of an attachment mechanism in accordance with alternative implementations of the present invention in a closed configuration and engaged with a tool for opening the attachment mechanism.
Figure 7B:
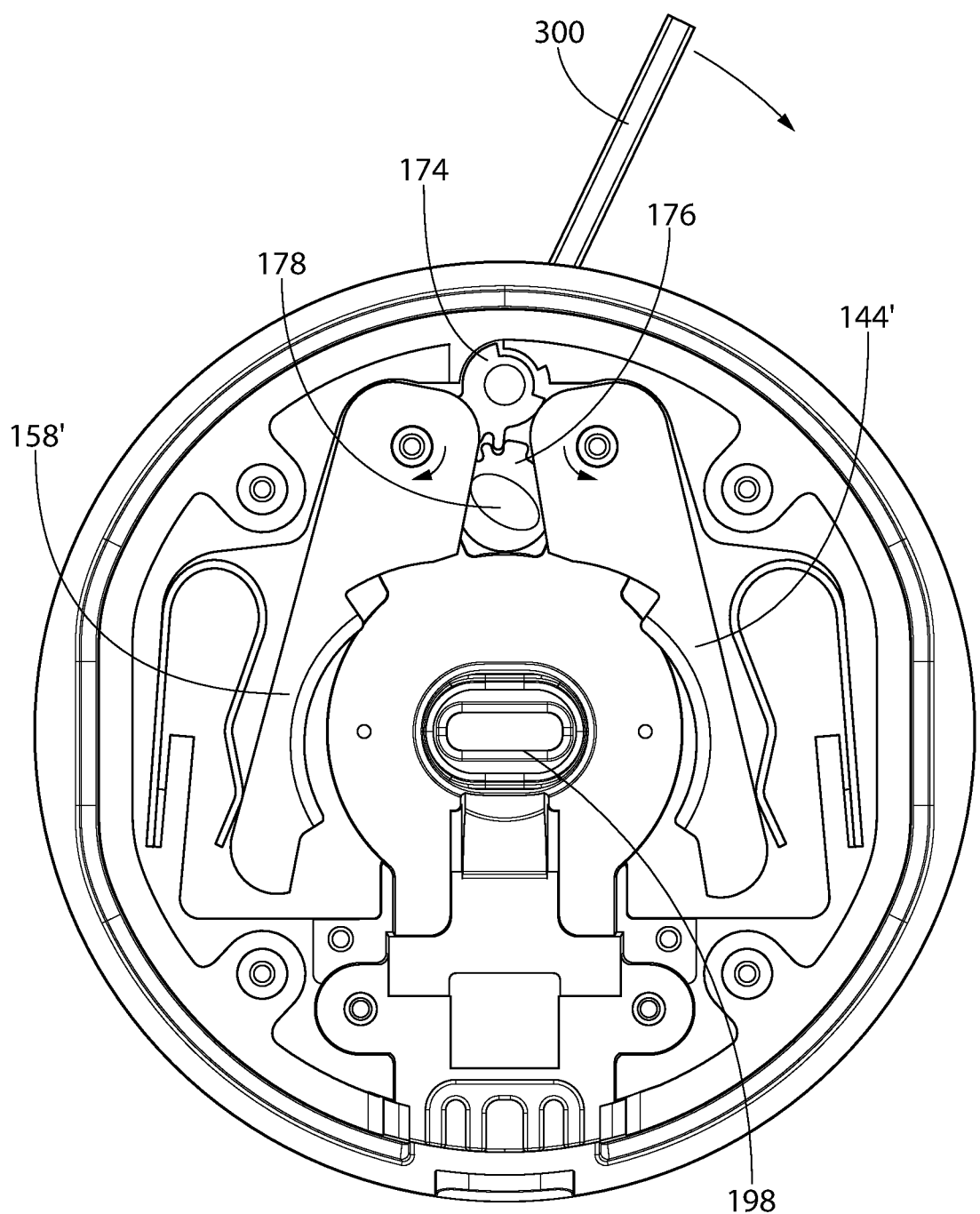
FIG. 7B shows a bottom view of the attachment mechanism of FIG. 7A in an open configuration upon actuation of the tool in accordance with some implementations of the present invention.

FIGS. 7A and 7B illustrate an alternative release mechanism according to other implementations of the present invention. In these implementations, the release mechanism includes a first gear 174 having teeth which are meshed with teeth of a second gear 176. A cam 178, which is positioned between and configured to contact each of first arm 144' and second arm 158', is coaxial and rotates with second gear 176. In some implementations, rotation of tool 300 (FIG. 7B) causes first gear 174 to rotate and transmit torque to second gear 176 through the meshed teeth, which in turn causes second gear 176 and cam 178 to rotate. As cam 178 is rotated, cam 178 pushes against each of first arm 144' and second arm 158' and causes them to rotate away from each other and separate. Other features of first arm 144' and second arm 158' may be similar to those described for first arm 144 and second arm 158, respectively.

In further implementations, the release mechanism may include a lock, for example, a cylinder lock, which requires a tool 300 in the form of a specific key to unlock. Opening 166, in some such implementations, is configured as the key hole for the insertion of tool 300 into the lock. In yet further implementations, release mechanism may include a lock which, for example, may be unlocked when a magnet, key card, or particular key fob is placed in proximity to system 100. In some implementations, for instance, system 100 includes a radio-frequency identification (RFID) reader which is configured to actuate the release mechanism when an appropriate RFID tag, which may be provided on a separate key fob, key card, etc., is positioned within the interrogation zone of the RFID reader. In other implementations, the release mechanism may be actuated remotely by a user, e.g., using a smart device, phone, computer, or other external electronic device that is in communication (wired or wirelessly) with system 100. In some implementations, the release mechanism may require a combination of two or more of the described implementations, for example, a physical tool or key in combination with a specific RFID identification, or a first remote unlocking via an external locking device and a second unlocking with a physical tool. In some implementations, only a single tool is required to actuate the release mechanism.

Figure 9A:
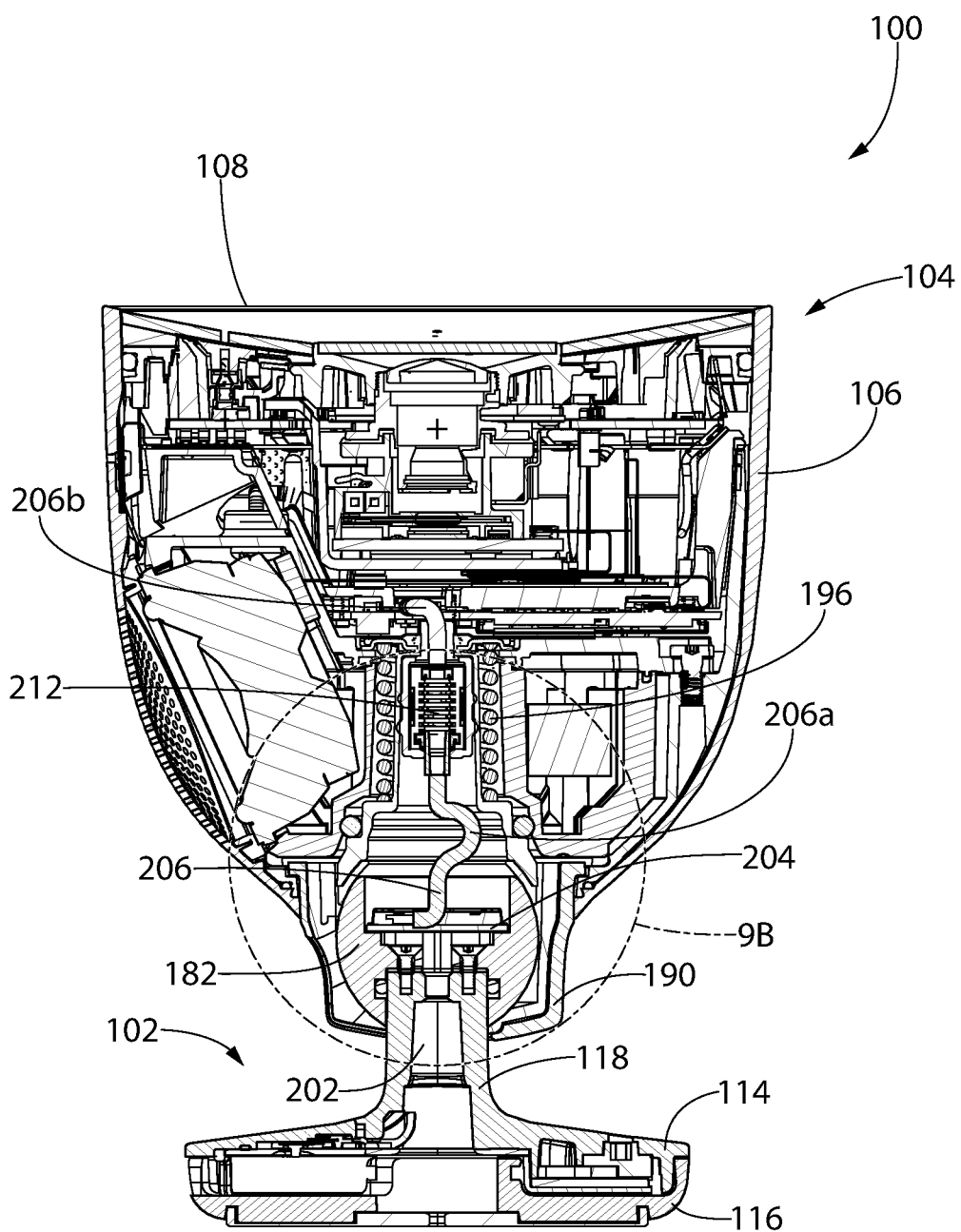
FIG. 9A is a cross-sectional side view of the system of FIG. 1A in accordance with some implementations of the present invention.
Figure 9B:
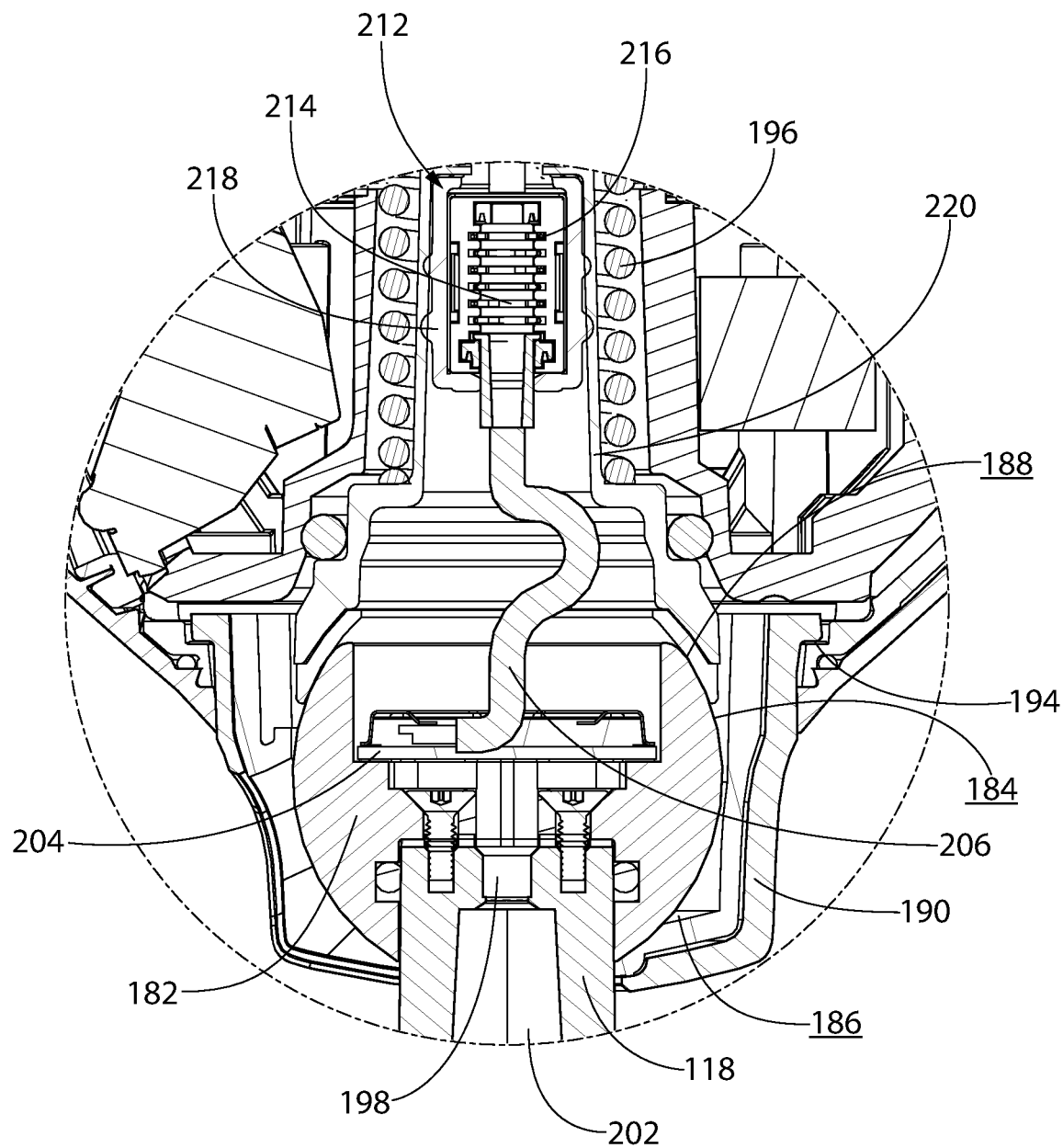
FIG. 9B is an enlarged portion of the cross-sectional view of FIG. 9A designated by the circle 9B showing a hinge assembly in accordance with some implementations of the present invention.
Figure 10:
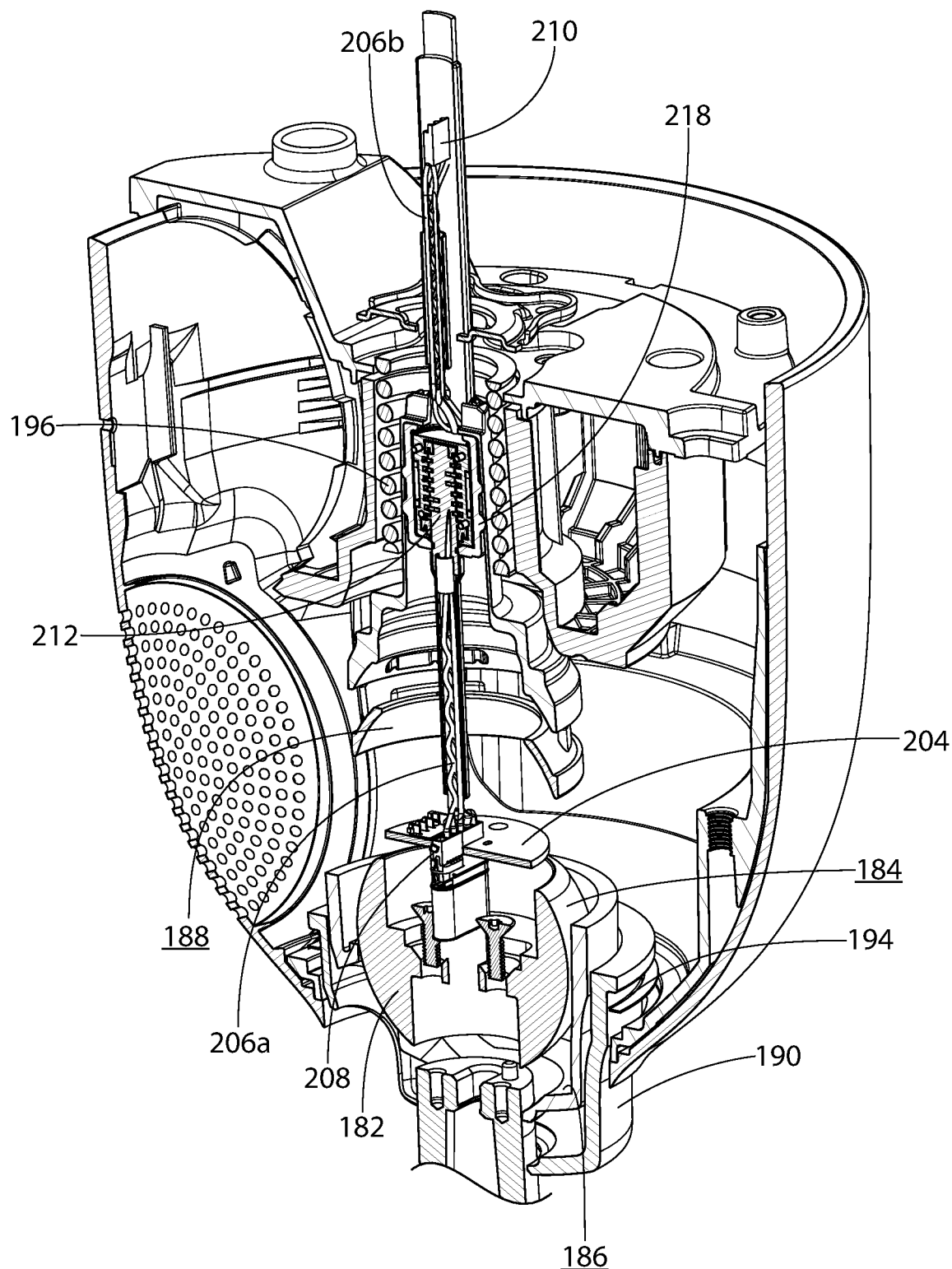
FIG. 10 is a partial exploded cutaway perspective side view of the system of FIG. 1A showing components of a hinge assembly in accordance with some implementations of the present invention.

As discussed herein, in some implementations, head portion 104 may be connected to base assembly 114 by a hinge assembly which is configured to permit head portion 104 to be moved relative to base assembly 114 by the user, for example, in order to position head portion 104 in a desired orientation. In some implementations, head portion 104 may be connected to stem 118 by the hinge assembly. Turning now to FIGS. 8-10, system 100 in some implementations includes a hinge assembly having a ball assembly 182 about which head portion 104 may be configured to rotate in two or at least two degrees of freedom. In some implementations, ball assembly 182 is coaxial with and rigidly fixed to stem 118. In some implementations, ball assembly 182 is not configured to move relative to stem 118. In some implementations, ball assembly 182 includes a spherically curved convex bearing surface 184 that is radially symmetric about an axis which is coaxial with an axis of stem 118. In some implementations, ball assembly 182 is positioned partially within housing 106 of head portion 104. In some implementations, ball assembly 182 may be disposed around at least a portion of stem 118. In some implementations, head portion 104 is configured to rotate about one or more axes which pass through the center of ball assembly 182. In some implementations, head portion 104 may be configured to tilt with respect to stem 118 about ball assembly 182 in a first degree of freedom such that the central axis A1 of head portion 104 (e.g., the optical axis) forms an angle with respect to the axis A2 of stem 118 from 0° (where the central axis of head portion 104 is coaxial with the axis of stem 118) up to, for example, 45°, 50°, 55°, 60°, 65°, 70°, 75°, 80°, 85°, or 90° (where the central axis A1 of head portion 104 is perpendicular to the axis A2 of stem 118). In further implementations, head portion 104 is configured to rotate about an axis of ball assembly 182 which is coaxial with the axis A2 of stem 118 in a second degree of freedom. In some implementations, head portion 104 is configured to be able rotate about the axis of stem 118 while head portion 104 is tilted with respect to the axis A2 of stem 118.

In certain implementations, ball assembly 182 may be positioned at least partially within a collar 190, which is coupled to head portion 104 at a position that is opposite of front element 108. In some implementations, ball assembly 182 is fully enclosed by head portion 104 and collar 190. In some implementations, collar 190 is disposed about at least a portion of stem 118. In some implementations, collar 190 is configured to move with head portion 104 when head portion 104 is tilted and/or rotated about ball assembly 182. In some implementations, collar 190 is configured to rotate about stem 118 (e.g., about axis A2). In some implementations, collar 190 includes one or more notches 192 (best shown in FIGS. 1A-4) which provide a clearance for stem 118 when head portion 104 is tilted with respect to stem 118. In some implementations, head portion 104 may only be tilted with respect to stem 118 toward the radial direction where the one or more notches 192 are positioned with respect to stem 118. In some implementations, each of the one or more notches 192 has a dimension (e.g., width) that is larger than a diameter of stem 118 to allow for the one or more notches 192 to receive at least a portion of stem 118 therein when head portion 104 is tilted with respect to stem 118.

In further implementations, head portion 104 is configured to rotate with respect to collar 190. In some implementations, head portion 104 is configured to rotate with respect to collar 190 about the central axis of head portion 104 to allow for the clocking motion in a third degree of freedom (depicted in FIG. 1C). Referring particularly to FIGS. 9B-10, in some implementations a low friction liner 194 may be provided between collar 190 and head portion 104 to provide smooth rotation between head portion 104 and collar 190. Low friction liner 194, for example, may be a washer disposed around a portion of collar 190 and made from a low friction polymer, for example, a fluoropolymer such as polytetrafluoroethylene (PTFE). In some implementations, friction between head portion 104 and collar 190 may be engineered such that a predetermined amount of torque is needed to rotate head portion 104 with respect to collar 190. The predetermined amount of torque may be, for example, at least 0.7 N·m, 0.8 N·m, at least 0.9 N·m, at least 1.0 N·m, at least 1.1 N·m, at least 1.2 N·m, at least 1.3 N·m, at least 1.4 N·m, at least 1.4 N·m, or at least 1.5 N·m.

In further implementations, an optional mechanism for maintaining the position of head portion 104 with respect to collar 190 may be included. For example, in some implementations, a locking mechanism may be provided for securing collar 190 in position with respect to head portion 104. In some such implementations, for example, the locking mechanism may require the user to push or pull head portion 104 towards or away from collar 190 in order to rotate head portion 104 with respect to collar 190.

In some implementations, head portion 104 may be rotated about ball assembly 182 manually by the user without the use of or need for additional tools. In some embodiments, after system 100 has been affixed to a wall or other desired surface, head portion 104 may be rotated about ball assembly 182 by a user using only a single hand. In further implementations, the hinge assembly is configured to maintain head portion 104 in the desired position and orientation set by the user without the need for the user to engage a separate clamping or locking mechanism (e.g., set screws). In some implementations, friction between bearing surface 184 of ball assembly 182 and one or more other components is at least sufficient to maintain the position of head portion 104 with respect to ball assembly 182 such that, for example, the weight of head portion 104 will not cause head portion 104 to drift or move away from the position set by the user. In some implementations, for example, head portion 104 may weigh at least 1 lb, at least 2 lbs, at least 3 lbs, at least 4 lbs, or at least 5 lbs. In some implementations, head portion 104 may weigh up to 1 lb, up to 2 lbs, up to 3 lbs, up to 4 lbs, or up to 5 lbs, for example. In some implementations, ball assembly 182 may be positioned between two or more surfaces configured to abut against bearing surface 184 with sufficient force to maintain head portion 104 in position with respect to ball assembly 182 until, for example, an additional force greater than the frictional force and/or greater than the frictional force and weight of head portion 104 is applied to head portion 104 (e.g., by the user). In some implementations, a minimum predetermined amount of torque is needed to rotate head portion 104 with respect to ball assembly 182. The minimum predetermined amount of torque may be, for example, from about 0.5 N·m to about 2.0 N·m, from about 0.75 N·m to about 1.75 N·m, from about 1.0 N·m to about 1.5 N·m, or from about 1.1 N·m to about 1.4 N·m according to some implementations. In some implementations, the predetermined amount of torque may be at least 0.7 N·m, 0.8 N·m, at least 0.9 N·m, at least 1.0 N·m, at least 1.1 N·m, at least 1.2 N·m, at least 1.3 N·m, at least 1.4 N·m, at least 1.4 N·m, or at least 1.5 N·m. In some implementations, the minimum predetermined amount of torque is or about 1.3 N·m. In some implementations, the hinge assembly includes one or more biasing elements (e.g., springs) that are positioned and configured to bias the two or more surfaces against bearing surface 184 to generate the sufficient frictional force.

With reference to FIGS. 8-10, in some implementations ball assembly 182 may be positioned against a first friction surface 186 that is configured to abut against a first portion of bearing surface 184 (e.g. on a first half or hemisphere of ball assembly 182). In further implementations, a second friction surface 188 may be positioned and configured to abut against a second portion of bearing surface 184 (e.g., on a second half or hemisphere of ball assembly 182). First and second friction surfaces 186, 188 are configured to move with respect to and bear against bearing surface 184 as head portion 104 is moved with respect to base assembly 114. In some implementations, first friction surface 186 is configured to be able to move with respect to second friction surface 188 when, for example, head portion 104 is rotated about central axis A1. In some implementations, first friction surface 186 and second friction surface 188 are configured to be able to rotate independently about central axis A1 of head portion 104. In some implementations, first friction surface 186 is fixed relative to collar 190, and second friction surface 188 is fixed relative to head portion 104. In some implementations, first friction surface 186 is positioned between collar 190 and ball assembly 182. In some implementations, first friction surface 186 may be configured as a socket to receive ball assembly 182. The socket, in some implementations, may be configured as a sleeve, tube, or cup which is configured surround ball assembly 182 and be positioned between ball assembly 182 and collar 190.

In some implementations, first friction surface 186 and second friction surface 188 may be made of the same materials. In other implementations, first friction surface 186 and second friction surface 188 may be made of different materials selected, for example, to have different coefficients of friction. For example, in some implementations, second friction surface 188 may be selected to have a lower coefficient of friction than first friction surface 186. In other implementations, second friction surface 188 may be selected to have a higher coefficient of friction than first friction surface 186. In some implementations, bearing surface 184 may made from a metal or metal alloy and first and second friction surfaces 186, 188 may be made from plastic or thermoplastic materials. Preferably, bearing surface 184 and/or first and second friction surfaces 186, 188 are made from materials with relatively low wear rates or high durability according to some implementations. In some implementations, bearing surface 184 may be treated to create a desired amount of friction. For example, in some implementations, bearing surface 184 may be textured, for example, by abrasive blasting, etching, etc. In some implementations, bearing surface 184 maybe chemically treated, for example, anodized to create an oxide surface layer or electroplated. In one example implementation, bearing surface 184 may be made from an aluminum alloy, for example, 6063 aluminum alloy, which has been abrasive blasted and/or anodized.

First and second friction surfaces 186, 188 may be made from materials which are different than the material used to form bearing surface 184. In some implementations, first and second friction surfaces 186, 188 are made from polymeric materials or composite materials. In some implementations, first and second friction surfaces 186, 188 may be made from relatively low friction materials. In some implementations, use of low friction materials may allow for smoother movement of head portion 104 about bearing surface 184. For example, in some implementations, first and/or second friction surfaces 186, 188 may include polyoxymethylene or acetal resins (e.g., available under the tradename DELRIN®). In some implementations, first and/or second friction surfaces 186, 188 may include polytetrafluoroethylene (PTFE) or PTFE incorporated into other polymers (e.g, acetal resins impregnated with PTFE fibers).

In order to create the necessary frictional force with the use of low friction materials for first and/or second friction surfaces 186, 188, a biasing element 196 may be provided according to some implementations which is configured to increase the contact force and/or normal force between bearing surface 184 of ball assembly 182 and first and/or second friction surfaces 186, 188. In some implementations, biasing element 196 includes one or more springs (e.g., a compression or coil spring) which are positioned and configured to press second friction surface 188 against bearing surface 184. In some implementations, biasing element 196 is configured to impose a force on ball assembly 182 against first friction surface 186. Biasing element 196 may be a single spring or, for example, two or more springs arranged in parallel or in series. In some implementations, second friction surface 188 is at least partially positioned between biasing element 196 and ball assembly 182. In some implementations, biasing element is a compression spring that is disposed within housing 106 and around the central axis A1 of head portion 104 (e.g., the optical axis). In some implementations, biasing element 196 is configured to provide a continuous spring force in a direction that is parallel to or coaxial with the central axis of head portion 104. In some implementations, biasing element 196 is arranged and positioned to continuously provide a spring force toward ball assembly 182 of at least 180 N, at least 190 N, at least 200 N, at least 210 N, at least 220 N, at least 230 N, at least 240 N, at least 250 N, at least 260 N, at least 270 N, at least 280 N, at least 290 N, or at least 300 N. In some implementations, biasing element 196 is arranged and positioned to continuously provide a spring force toward ball assembly 182 between 180 N and 300 N, between 190 N and 290 N, between 200 N and 280 N, between 210 N and 270 N, between 220 N and 260 N, or between 230 N and 250 N.

In some implementations, the hinge assembly of the present invention may be arranged to further conceal cables connecting to the electronic device in head portion 104. As described above, in certain implementations, an external power/data cable such as cable 200 may be routed into mounting plate 116 through either lateral opening 124 or back opening 126. Cable 200 may be, in some implementations, a USB cable having, for example, a USB 2.0 plug, USB 3.0 plug, USB type-A plug, USB type-B plug, USB type-C plug, mini-USB plug, or micro-USB plug. In some implementations, mount 102 includes a receptacle 198 for receiving and an electronically connecting with the plug 200a of cable 200. In some implementations, receptacle 198 is a component of base assembly 114. In some such implementations, receptacle 198 may be housed within stem 118 of base assembly 114. In some implementations, stem 118 includes a lumen 202 into which the plug of cable 200 may be inserted to reach receptacle 198. In some implementations, as illustrated in FIG. 8, plug 200a of cable 200 may include an outer gasket 200b configured to make a liquid-tight seal against the walls of lumen 202 when the plug is inserted therein to prevent water from leaking into system 100 through lumen 202. In some implementations receptacle 198 may be located at an end of stem 118 and positioned within ball assembly 182. In some implementations, receptacle 198 may in turn be positioned on or electrically connected to an electronics board, for example, printed circuit board (PCB) 204 that may also be positioned and secured within ball assembly 182. PCB 204 may include, for example, electronic circuitry which is in electronic communication with and configured to receive signals from and/or transmit signals to receptacle 198 and cable 200. In some implementations, PCB 204 may include a power converter (e.g., a buck converter or DC-to-DC step down converter). In some implementations, a voltage is input into system 100 from cable 200, and the power converter is configured to step down the input voltage.

In further implementations, PCB 204 is connected to one or more interconnect wires arranged in a cable bundle 206 that may be configured to transmit power and/or data signals between PCB 204 and the electronic device (e.g., camera) in head portion 104. In some implementations, cable bundle 206 may be routed from PCB 204 in ball assembly 182 and at least partially through biasing element 196, generally along the central axis of head portion 104. In some implementations, cable bundle 206 may have a length to provide enough slack to accommodate the movement of head portion 104 with respect to ball assembly 182, for example, the tilting of head portion 104.

In some implementations, cable bundle 206 includes a first portion 206a connected to PCB 204 and a second portion 206b in electrical communication with the electronics of head portion 104. In some such implementations, first portion 206a includes a connector 208 for connecting first portion 206a to PCB 204, and second portion 206b includes a connector 210 for connecting second portion 206b to the electronics of head portion 104. In some implementations, second portion 206b is configured to rotate with respect to first portion 206a as head portion 104 is rotated with respect to ball assembly 128. In some implementations, first portion 206a is configured to have an unlimited degree of rotational movement with respect to second portion 206b. In some such implementations, cable bundle 206 includes a rotary electrical joint or slip ring connection 212 to electrically connect first portion 206a with second portion 206b while allowing further allowing second portion 206b to rotate with respect to first portion 206a. In some implementations, including slip ring connection 212 in cable bundle 206, for example, allows head portion 104 to rotate with respect to ball assembly 182 without cable bundle 206 becoming severely twisted, which could otherwise limit the rotation of head portion with respect to ball assembly 182 and/or damage cable bundle 206 for example.

Figure 11:
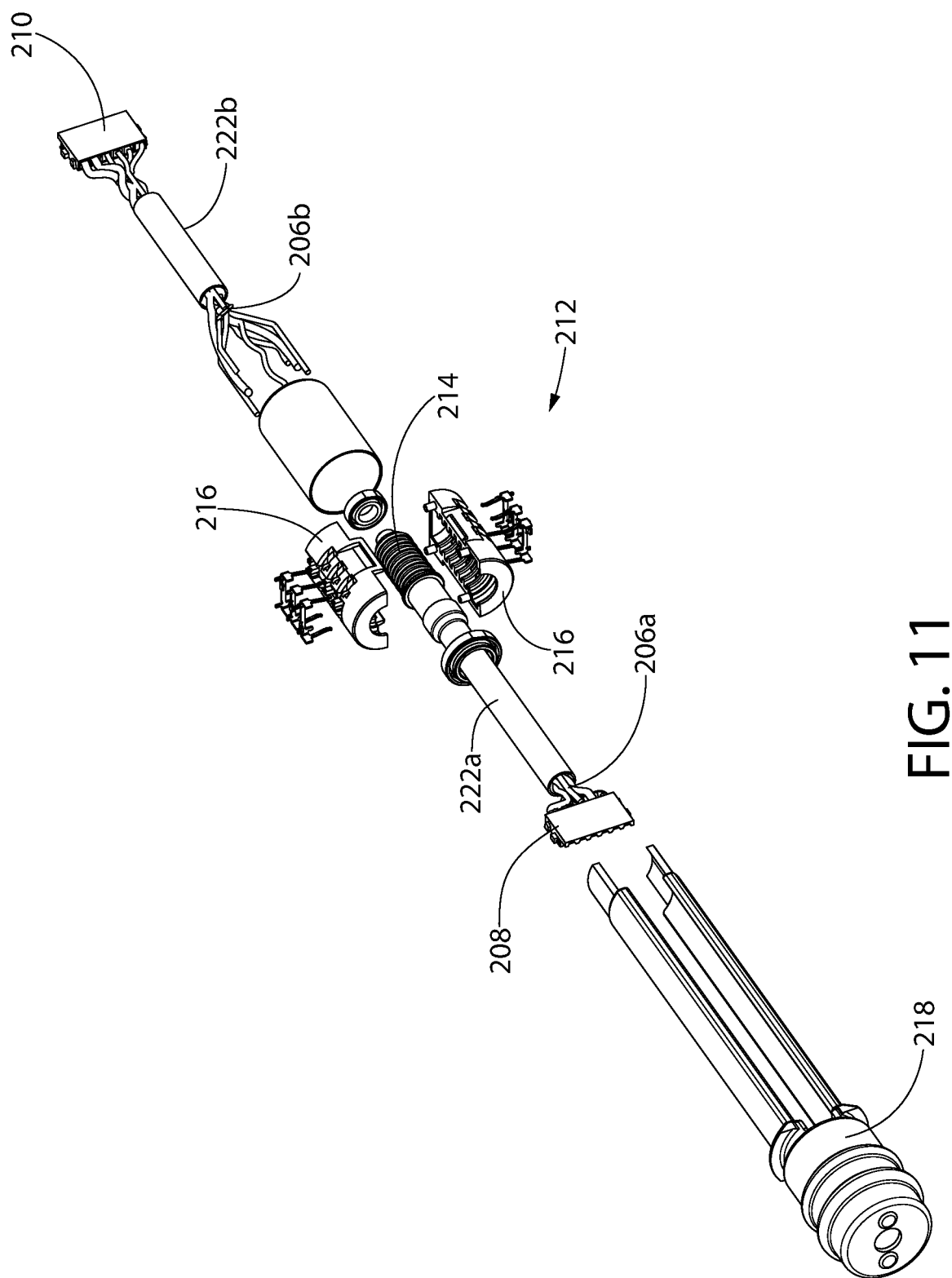
FIG. 11 is an exploded view of components of a slip ring connector that may be used with the mount in accordance with some implementations of the present invention.

As best shown in FIG. 11, in some implementations, slip ring connection 212 includes a ring assembly 214 having one or more ring-shaped electrical contacts electrically connected to the wires in the first portion 206a. Slip ring connection 212, in further implementations, also includes one or more conductive brush elements 216 electrically connected to the wires in the second portion 206b and which are configured to touch and make electrical contact with the one or more ring-shaped electrical contacts of ring assembly 214. Brush elements 216 may include, in some implementations, biasing elements configured to bias the brush elements against the one or more ring-shaped electrical contacts of ring assembly 214. Brush elements 216 are preferably configured to maintain electrical contact with the ring assembly 214 even as ring assembly 214 rotates with respect to the brush elements 216. In some implementations, slip ring connection 212 may be positioned within biasing element 196. In some implementations, slip ring connection 212 is positioned within a tube 220 which extends through biasing element 196. In some such implementations, slip ring connection 212 may be further covered by a sealing element 218 to provide a liquid-tight seal around slip ring connection 212 to help prevent the flow of water into head portion 104 through the tube 220. In some implementations, second friction surface 188 may be disposed between an end of tube 220 and ball assembly 182. In some implementations, second friction surface 188 is fixed to the end of tube 220.

In some implementations, first portion 206a and/or second portion 206b of cable bundle 206 includes a sheath or wrapping 222a, 222b which is configured to surround the interconnect wires that make up cable bundle 206. Sheath or wrapping 222a, 222b may be flexible in some implementations. For example, in some implementations, sheath or wrapping 222a, 222b may include a flexible tape, e.g., acetate tape, which is wrapped around the interconnect wires. In some implementations, sheath or wrapping 222a, 222b helps to prevent the interconnect wires that make up cable bundle 206 from twisting around each other when head portion 104 is rotated about ball assembly 182. In some implementations, sheath or wrapping 222a, 222b facilitates rotation of second portion 206b with respect to first portion 206a by helping to maintain a stiffness of the cable bundle 206 and helping to transfer the rotation force applied to second portion 206b to the slip ring connection 212. In some implementations, sheath or wrapping 222a, 222b helps provide cable bundle 206 with a resistance to twisting that is greater than a force needed to induce rotation of the slip ring connection 212.

Installation of system 100 according to some implementations will now be described. Once a proper location for system 100 is determined on a wall, ceiling, or other surface, mounting plate 116 can be securely affixed to the location such that back surface 134 of mounting plate 116 abuts against the wall, ceiling, or other surface. Mounting plate 116, in some implementations, may be securely affixed using, for example, one or more fasteners 136 or other the means described herein. Cable 200 may be routed into mounting plate 116 through either lateral opening 124 or back opening 126 depending on the location of cable 200. As described above, if cable 200 may be passed through the wall or surface on which system 100 is to be mounted, cable 200 may pass through back opening 126 (as shown in FIG. 8). If, according to other implementations, the user chooses to position cable 200 along the wall or other surface to which system 100 is to be affixed, cable 200 may be positioned through lateral opening 124. Cable 200, after being positioned through mounting plate 116, may be connected to base assembly 114 prior to connecting base assembly 114 to mounting plate 116. In some implementations, the plug of cable 200 (e.g., plug 200a) may be inserted into stem 118 of base assembly 114 which may contain a receptacle (e.g., receptacle 198) for receiving the plug of cable 200. For example, plug of cable 200 may be a USB-type C plug and stem 118 may include a corresponding USB receptacle for transmitting/receiving power and/or data to and from the plug of cable 200.

After affixing mounting plate 116 and connecting cable 200 to base assembly 114, base assembly 114, having head portion 104 mounted thereon, may be securely engaged with mounting plate 116. In some implementations, base assembly 114 may be securely engaged with mounting plate 116 through an attachment mechanism as described. In some implementations, base assembly 114 may be a snap-fit onto mounting plate 116. In some implementations, base assembly 114 may be securely engaged onto mounting plate 116 through a linear movement of base assembly 114 towards mounting plate 116. In some implementations, base assembly 114 is oriented with respect to mounting plate 116 such that mounting surface 142 of base assembly 114 is positioned to face mounting plate 116, and keyed surfaces 130 of mounting plate 116 are aligned with corresponding surfaces 132 of base assembly 114. Once properly oriented, base assembly 114 may be moved in a first motion toward mounting plate 116 until base assembly 114 is securely engaged with mounting plate 116, for example, in a linear motion generally perpendicular to the wall, ceiling, or other surface to which mounting plate 116 is affixed. In some implementations, once base assembly 114 is properly oriented with respect to mounting plate 116, no rotation of base assembly 114 with respect to mounting plate 116 is required to securely engage base assembly 114 with mounting plate 116. In some implementations, base assembly 114 may be brought into secure engagement with mounting plate 116 by the user through the use of only a single hand. Moreover, in some implementations, base assembly 114 securely engages with mounting plate 116 via the attachment mechanism without the need for any additional tools, fasteners, or components, and without the need for the actuation by the user of any additional locking features (e.g., clamps, set screws, etc.).

After base assembly 114 is securely engaged to mounting plate 116, the user may move head portion 104 with respect to base assembly 114 to the desired orientation by virtue of the hinge assembly described herein. In some implementations, head portion 104 may be tilted with respect to stem 118 such that central axis A1 is angled with respect to axis A2 of stem 118 (e.g., with a 60° to 80° range of motion). In further implementations, head portion 104 may be rotated an unlimited degree about axis A2 of stem 118. In still further implementations, head portion 104 may be rotated an unlimited degree about central axis A1 (i.e., clocking motion). In some implementations, the hinge assembly is configured to maintain the position of head portion 104 with respect to based assembly 114 via frictional force such that head portion 104 will not drift from the set position by the weight of head portion 104. In some implementations, a force substantially greater than the weight of head portion 104 must be applied to move head portion 104 with respect to base assembly 114. In some implementations, a minimum predetermined amount of torque is needed to rotate head portion 104 with respect to base assembly 114. The minimum predetermined amount of torque may be, for example, from about 0.5 N·m to about 2.0 N·m according to some implementations. In some implementations, the predetermined amount of torque may be at least 0.7 N·m, 0.8 N·m, at least 0.9 N·m, at least 1.0 N·m, at least 1.1 N·m, at least 1.2 N·m, at least 1.3 N·m, at least 1.4 N·m, at least 1.4 N·m, or at least 1.5 N·m. In some implementations, the minimum predetermined amount of torque is or about 1.3 N·m. In some implementations, the position of head portion 104 with respect to based assembly 114 is maintained by the hinge assembly without the need any additional locking features (e.g., clamps, set screws, etc.).

Base assembly 114 and head portion 104 may be unsecured from mounting plate 116, for example, if a user decides to move system 100 to a different location or to access cable 200. Base assembly 114 and head portion 104 may be unsecured from mounting plate 116, according to some implementations, using a second motion. The second motion, in some implementations, is different than the first motion and/or different than a reverse of the first motion that was used to secure base assembly 114 to mounting plate 116. In some implementations, for example, base assembly 114 is configured to be securely engaged with mounting plate 116 by pressing base assembly 114 into mounting plate 116 in a linear motion along a first direction that is or substantially is perpendicular to back surface 134, whereas base assembly 114 is configured to be disengaged from mounting plate 116 through a different second motion (e.g., a rotational motion). In some implementations, as described, a separate tool 300 is required to separate base assembly 114 from mounting plate 116. Tool 300, for example, may be specifically shaped key, wrench, driver, or the like which must be inserted into opening 166 and rotated to actuate a release mechanism to separate base assembly 114 from mounting plate 116. In other implementations, tool 30 may be a magnetic, RFID tag, or other device configured to unlock an electronic lock.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An attachment mechanism for mounting an electronic device to a surface, comprising:
   a mounting plate configured to attach to the surface, the mounting plate having at least one projection; and
   a base configured to releasably couple to the mounting plate, the base comprising:
      a first biasing member;
      a second biasing member;
      a first arm pivotably coupled to the base and biased toward a first direction by the first biasing member, the first arm configured to interlock with the at least one projection when the base is coupled to the mounting plate, the first arm being concealed by the base and the mounting plate when the base is coupled to the mounting plate;
      a second arm pivotably coupled to the base and biased toward the first arm by the second biasing member, the second arm configured to interlock with the at least one projection when the base is coupled to the mounting plate, the second arm being concealed by the base and the mounting plate when the base is coupled to the mounting plate; and
      a release mechanism coupled to the first arm such that actuation of the release mechanism when the base is coupled to the mounting plate in a secured engagement causes movement of the first arm in a second direction to disengage the first arm from the at least one projection to enable detachment of the base from the mounting plate.

2. The attachment mechanism of claim 1, wherein actuation of the release mechanism when the base is coupled to the mounting plate in a secured engagement causes movement of the second arm away from the at least one projection to enable detachment of the base from the mounting plate.

3. The attachment mechanism of claim 1, wherein the first arm is pivotable about a first axis and includes a first lever, wherein the second arm is pivotable about a second axis and includes a second lever, and wherein the release mechanism comprises a cam pivotable about a third axis, the cam being configured to apply a force on the first lever and the first lever being configured to apply a force to the second lever when the release mechanism is actuated.

4. The attachment mechanism of claim 3, wherein the cam is coupled to a keyed opening configured to receive a tool through an external surface of the base.

5. The attachment mechanism of claim 4, wherein the release mechanism is configured to be actuated when the tool is rotated while received within the keyed opening.

6. The attachment mechanism of claim 5, wherein the cam is configured to pivot about the third axis as the tool is rotated while received within the keyed opening, wherein a portion of the cam is configured to push the first lever against the second lever when the cam is pivoted about the third axis to cause the first arm and the second arm to pivot away from each other.

7. The attachment mechanism of claim 1, wherein the first biasing member is configured to apply a force to an outer side of the first arm, and wherein the first arm includes an inner side that is opposite the outer side having an engagement edge configured to contact the at least one projection when the base is coupled to the mounting plate.

8. The attachment mechanism of claim 7, wherein the engagement edge includes a beveled or chamfered surface that is shaped and configured to translate a force impinging on the beveled or chamfered surface into a lateral force to move the first arm in the second direction.

9. The attachment mechanism of claim of claim 8, wherein the at least one projection includes a beveled or radiused surface which is configured to contact the beveled or chamfered surface of the engagement edge when the base is being coupled to the mounting plate.

10. The attachment mechanism of claim 7, wherein the at least one projection defines a groove, and wherein the engagement edge is received within the groove when the base is coupled to the mounting plate.

11. The attachment mechanism of claim 10, wherein the release mechanism is configured to cause the engagement edge to separate from the groove when the release mechanism is actuated.

12. The attachment mechanism of claim 7, wherein the inner side of the first arm includes a concavely curved portion which at least partially defines an opening for receiving the at least one projection.

13. The attachment mechanism of claim 12, wherein the at least one projection comprises a wall on the mounting plate having a convexly curved exterior contour, and wherein the concavely curved portion of the first arm is shaped to at least partially fit around and abut against the convexly curved exterior contour.

14. The attachment mechanism of claim 13, wherein the mounting plate includes a cable opening sized to receive one or more electronic cables, and wherein the wall is positioned at least partially around the cable opening.

15. The attachment mechanism of claim 1, wherein the mounting plate includes one or more keyed features which are configured to mate with one or more corresponding features on the base when the base is coupled to the mounting plate.

16. The attachment mechanism of claim 15, wherein the one or more keyed features are configured to prevent the base from coupling with the mounting plate if the base is not in one of one or more predetermined orientations with respect to the mounting plate.

17. The attachment mechanism of claim 16, wherein when the base is in one of the one or more predetermined orientations with respect to the mounting plate, the base is configured to be coupled to the mounting plate through a linear movement of the base toward the mounting plate in a direction that is substantially perpendicular to the surface.

18. A camera for mounting onto a surface comprising:
   a head portion having a housing containing a camera module;

a mounting plate configured to attach to the surface, the mounting plate having at least one projection; and a base connected to the head portion and configured to releasably couple to the mounting plate, the base comprising:
  a first biasing member;
  a second biasing member;
  a first arm pivotably coupled to the base and biased toward a first direction by the first biasing member, the first arm configured to interlock with the at least one projection when the base is coupled to the mounting plate, the first arm being concealed by the base and the mounting plate when the base is coupled to the mounting plate;
  a second arm pivotably coupled to the base and biased toward the first arm by the second biasing member, the second arm configured to interlock with the least one projection when the base is coupled to the mounting plate, the second arm being concealed by the base and the mounting plate when the base is coupled to the mounting plate; and
  a release mechanism coupled to the first arm such that actuation of the release mechanism when the base is coupled to the mounting plate in a secured engagement causes movement of the first arm in a second direction to disengage the first arm from the at least one projection to enable detachment of the base from the mounting plate.

19. The camera of claim 18, further comprising a hinge assembly connecting the head portion to the base, the hinge assembly configured to allow the head portion to move relative to the base in at least two degrees of freedom.

20. An attachment mechanism for mounting an electronic device to a surface, comprising:
  a mounting plate configured to attach to the surface, the mounting plate having at least one projection; and
  a base configured to releasably couple to the mounting plate, the base comprising:
    a first biasing member;
    a first arm having an inner side pivotably coupled to the base and biased toward a first direction by the first biasing member, the first arm configured to interlock with the at least one projection when the base is coupled to the mounting plate, the first arm being concealed by the base and the mounting plate when the base is coupled to the mounting plate; and
    a release mechanism coupled to the first arm such that actuation of the release mechanism when the base is coupled to the mounting plate in a secured engagement causes movement of the first arm in a second direction to disengage the first arm from the at least one projection to enable detachment of the base from the mounting plate,
  wherein the first biasing member is configured to apply a force to an outer side of the first arm, and Wherein the first arm includes an inner side that is opposite the outer side having an engagement edge configured to contact the at least one projection when the base is coupled to the mounting plate,
  wherein the inner side of the first arm includes a concavely curved portion which at least partially defines an opening, for receiving the at least one projection,
  wherein the at least one projection comprises a wall on the mounting plate having a convexly curved exterior contour, and wherein the concavely curved portion of the first arm is shaped to at least partially fit around and abut against the convexly curved exterior contour,
  wherein the mounting plate includes a cable opening sized to receive one or more electronic cables, and wherein the wall is positioned at least partially around the cable opening.

21. An attachment mechanism for mounting an electronic device to a surface, comprising:
  a mounting plate configured to attach to the surface, the mounting plate having at least one projection; and
  a base configured to releasably couple to the mounting plate, the base comprising:
    a first biasing member;
    a first arm pivotably coupled to the base and biased toward a first direction by the first biasing member, the first arm configured to interlock with the at least one projection when the base is coupled to the mounting plate, the first arm being concealed by the base and the mounting plate when the base is coupled to the mounting plate; and
    a release mechanism coupled to the first arm such that actuation of the release mechanism when the base is coupled to the mounting plate in a secured engagement causes movement of the first arm in a second direction to disengage the first arm from the at least one projection to enable detachment of the base from the mounting plate,
  wherein the mounting plate includes one or more keyed features configured to mate with one or more corresponding features on the base when the base is coupled to the mounting plate and configured to prevent the base from coupling with the mounting plate if the base is not in one of one or more predetermined orientations with respect to the mounting plate.

22. The attachment mechanism of claim 21, wherein when the base is in one of the one or more predetermined orientations with respect to the mounting plate, the base is configured to be coupled to the mounting plate through a linear movement of the base toward the mounting plate in a direction that is substantially perpendicular to the surface.

* * * * *